United States Patent
White et al.

(10) Patent No.: US 6,532,152 B1
(45) Date of Patent: Mar. 11, 2003

(54) RUGGEDIZED HAND HELD COMPUTER

(75) Inventors: Ryan R. White, Coralville, IA (US); Steven R. Kunert, Cedar Rapids, IA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/549,046

(22) Filed: Apr. 13, 2000

Related U.S. Application Data

(63) Continuation-in-part of application No. 09/514,603, filed on Feb. 28, 2000, which is a continuation-in-part of application No. 09/429,452, filed on Oct. 28, 1999.
(60) Provisional application No. 60/108,553, filed on Nov. 16, 1998.

(51) Int. Cl.[7] .............................................. G02F 1/1343
(52) U.S. Cl. ........................ 361/692; 361/681; 361/683; 312/223.1; 349/58
(58) Field of Search ................................ 361/681, 683, 361/686, 697, 731, 725, 679, 730, 759, 780; 364/708.1, 708; 312/223.1, 296, 223.2; 248/580, 602, 612, 615, 616, 618, 632–634, 636, 638, 917, 560; 174/52.1, 65 R, 52.3; 349/60, 65, 58, 150, 64, 187, 122, 161; 359/44, 48, 83, 100; 40/448, 159.1, 778; 206/586, 320; 345/905

(56) References Cited

U.S. PATENT DOCUMENTS 5,002,368 A * 3/1991 Anglin ........................ 350/334

(List continued on next page.)

FOREIGN PATENT DOCUMENTS

| JP | 408220515 A | * | 8/1996 | ........... G02F/1/133 |
| JP | 409061795 A | * | 3/1997 | ........... G02F/1/133 |
| JP | 409114391 A | * | 5/1997 | ............. G09F/9/00 |

OTHER PUBLICATIONS

Article: "Plasma Display Resilient Frame Mount" in the IBM Technical Disclosure Bulletin. Sep. 1, 1983. vol. No. 26, Issue No. 4. pp. 2048–2049.*

Article: "Plasma Panel Packaging" in the IBM Technical Disclosure Bulletin. Sep. 1, 1983. vol. No. 26, Issue No. 4. pp. 2050–2051.*

*Primary Examiner*—Darren Schuberg
*Assistant Examiner*—Michael Datskovsky

(57) ABSTRACT

The present invention provides a durable, reliable, and ergonomic computing system that is highly customizable and ungradable. Product flexibility and ease of customization is provided by the ability to employ a wide range of peripherals and accessories. In one embodiment, a docking unit is provided that provides additional functionality and flexibility. Flexibility is further enhanced by a CPU upgrade path as well as easily ungradable main system memory and hard disk drive. In one embodiment, a T-shaped main logic board (MLB) is provided as is a method of positioning or arranging the internal components of a portable computer by employing the same. In this manner, the size and number of components that may be housed internally within the computer are greater than would be possible with a conventional generally rectangular main logic board. In another aspect, the present invention relates to a shock mounting system for a portable computer having a flat panel display, comprising a shock absorbing member encasing the perimeter of the flat panel display and a metal, e.g., magnesium alloy, frame mounted within the interior compartment retaining the shock absorbing member. In a related embodiment, the metal frame forms at least a portion of the peripheral walls housing the computer.

7 Claims, 24 Drawing Sheets

U.S. PATENT DOCUMENTS

| | | | | |
|---|---|---|---|---|
| 5,150,231 A | * | 9/1992 | Iwamoto et al. | 359/44 |
| 5,228,013 A | * | 7/1993 | Bik | 368/223 |
| 5,299,038 A | * | 3/1994 | Hamada et al. | 359/49 |
| 5,363,227 A | * | 11/1994 | Ichikawa et al. | 359/83 |
| 5,479,285 A | * | 12/1995 | Burkey | 359/83 |
| 5,486,942 A | * | 1/1996 | Ichikawa et al. | 359/83 |
| 5,550,712 A | * | 8/1996 | Crockett | 361/752 |
| 5,568,357 A | * | 10/1996 | Kochis et al. | 361/681 |
| 5,583,529 A | * | 12/1996 | Satou | 345/87 |
| 5,583,681 A | * | 12/1996 | Shioya et al. | 349/60 |
| 5,606,438 A | * | 2/1997 | Margalit et al. | 349/60 |
| 5,659,376 A | * | 8/1997 | Uehara et al. | 349/58 |
| 5,710,607 A | * | 1/1998 | Iwamoto et al. | 349/60 |
| 5,808,707 A | * | 9/1998 | Niibori et al. | 349/60 |
| 5,831,816 A | * | 11/1998 | Johns et al. | 361/681 |
| 5,844,772 A | * | 12/1998 | Lee et al. | 364/708.1 |
| 5,870,160 A | * | 2/1999 | Yanagawa et al. | 349/141 |
| 5,905,550 A | * | 5/1999 | Ohgami et al. | 349/58 |
| 5,946,062 A | * | 8/1999 | Hasegawa et al. | 349/58 |
| 6,052,279 A | * | 4/2000 | Friend et al. | 361/686 |
| 6,055,029 A | * | 4/2000 | Kurihara et al. | 349/65 |
| 6,061,231 A | * | 5/2000 | Crockett | 361/681 |
| 6,151,207 A | * | 11/2000 | Kim | 361/681 |
| 6,172,732 B1 | * | 1/2001 | Hayakawa et al. | 349/152 |

* cited by examiner

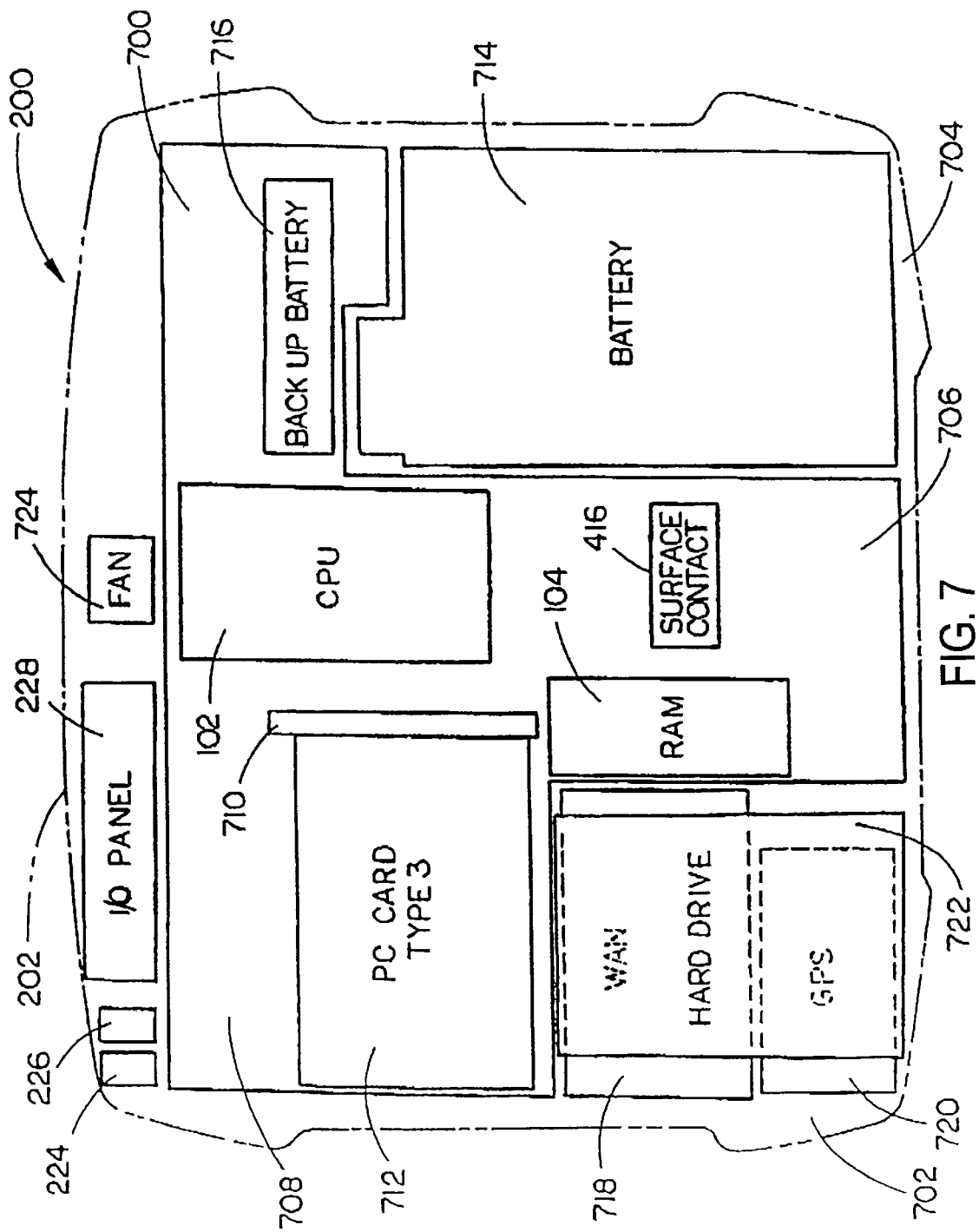

6640 Computer Processor Cooling Scheme

Large metal heatsink with processor attached, has plastic cooling tunnel and ductfan

RUGGEDIZED HAND HELD COMPUTER

CROSS REFERENCE TO RELATED APPLICATIONS

This application is a continuation-in-part of pending application Ser. No. 09/514,603 filed Feb. 28, 2000, application Ser. No. 09/514,603 is in turn a continuation-in-part (CIP) of application Ser. No. 09/429,452 filed Oct. 28, 1999, application Ser. No. 09/429,452 in turn claims priority under 35 U.S.C. §119 to the following U.S. provisional patent application: Provisional Application No. 60/108,553, filed Nov. 16, 1998, application Ser. Nos. 09/514,603 and 09/429, 452 and Provisional Application No. 60/108,553 are hereby incorporated by reference herein in their entireties.

The following additional pending U.S. patent applications are hereby incorporated by reference herein in their entireties: application Ser. No. 08/690,210 for Steven R. Kunert filed Jul. 25, 1996, and application Ser. No. 08/965,283 for Scott L. Dunkirk filed Nov. 6, 1997.

BACKGROUND OF THE INVENTION

The present invention pertains to portable data handling systems, and more particularly, to a compact pen-based computer system is easy to use, rugged, and highly customizable and ungradable. The present invention also pertains to computer docking systems with different levels of docking functionality.

Portable computers, such as hand-held data entry terminals and the like are commonly used for data or information handling in a variety of mobile applications. For example, portable computers may be used to increase the efficiency of the field service operations of gas, electric, water, telephone, and cable television utilities, and so forth. Likewise, portable computers find widespread in the fields of sales, e.g., as portable point of sale terminals, distribution, delivery services, route accounting or auditing, healthcare, insurance claims adjustment, public safety, plant/equipment maintenance, and so forth, where it is advantageous to employ a portable computer terminal in a route or otherwise mobile setting. Such applications include sales, invoicing, distribution, control and inventory of products delivered, and delivery or tracking of products or packages, warehouse stock control, process control on production lines, etc. Portable or hand-held data terminals have proven useful in increasing the efficiency of such applications by automating the entry and electronic storage of order, sales, delivery, receipt, pricing, inventory control, and other accounting functions.

Users of hand-held computer systems have a variety of needs and budgets, ranging from simple data collection and storage units to advanced systems for sales or distribution automation allowing real time communication with a wireless network. To accommodate a variety of needs and budgets, it is known to provide a basic data collection and storage terminal whereby additional peripheral devices can be added, depending on a user's needs. Examples of such peripheral devices include bar code scanners or other optical scanning devices, additional RAM, hard drives or other mass storage device such as devices for storage on removable magnetic media, optical media, magneto-optical media, removable hard drive media, and the like, CD-ROM, DVD-ROM, recordable (read/write) CD or DVD, magnetic stripe readers, wired or wireless LAN links, WAN links, CDPD links, microlink, optical links, ultrasound links, extra battery packs or back up batteries, etc.

One prior art strategy to provide an upgradable system is to provide a computer system with basic data collection and storage features and a means for attaching additional external units as needed. While such systems provide a relatively small basic unit, the expandability depends on the availability compatible external peripherals having the desired functionality and, furthermore, the number of peripherals which may be attached at any one time may be limited. In some systems, such additional units can be attached to the end of the data terminal. While such a system provides expandability, there are disadvantages. For example, computers designed for mobile use are often ruggedly constructed to meet certain criteria, e.g., repeated drops or a minimum number of drops from a given height, etc. However, the same terminal designed with a certain degree of ruggedness may lose its survivability with a module such as a scanner or an RF transceiver, and so forth, attached as an end unit. Alternatively, the attached module itself may not possess the same survival characteristics as the terminal to which it is to be attached.

Another disadvantage of employing external end unit modules is that the mass distribution and balance are altered and the same unit with an end cap module may not be as ergonomically favorable to use.

Yet another disadvantage of end cap module systems involves moisture problems. Hand-held units that can withstand use in inclement weather may lose this ability when an end cap module with an inferior seal is employed.

Finally, when a peripheral device is connected externally, it may be difficult to provide adequate shielding, causing problems with electromagnetic interference, problems with dissipation of a discharge of accumulated static electricity by a user, and so forth.

Some of the aforementioned problems, such as balance, shielding, weather resistance may be alleviated in systems that employ expandable modules or pods, e.g., scanners, RF transceivers, memory, modems, etc., which are designed to fit on a centrally located surface of the computer, for example, the undersurface of a hand-held terminal which may contain a removable plate, rather than the end of the data terminal. However, the use of such modular-pods can be disadvantageous in that their attachment disrupts the compactness of the computer and alters the profile of the computer. In this manner, either the overall thickness of the computer is substantially increased or, at the very least, areas of increased thickness, i.e., bulges or protrusions will be present on the housing surface. It would thus be desirable to provide a computer that provides (or provides internal space therefore, e.g., for future upgrades), the desired level of functionality without the need for altering the profile of the computer.

Thus, it is desirable to provide a computer system that provides a range of configurations from simple data collection capabilities for later batch transfer of data to the most advanced and demanding applications, including applications requiring a plurality of wireless connections, which may be housed within a single housing and without the need for custom designed external upgrade modules. In addition to solving the problems with ruggedness, ergonomics, moisture, and shielding, of such prior art hand-held computers, the present computer serves to reduce design and upgrade costs since specially designed upgrade modules or components are not required.

SUMMARY OF THE INVENTION

Numerous objects and advantages of the present invention are provided by the portable computing system according to the present invention. In one embodiment, the present invention provides a durable, reliable, and ergonomic computing system that is highly customizable and ungradable. Product flexibility and ease of customization is provided by the ability to employ a wide range of peripherals and accessories. In one embodiment, a docking unit is provided that provides additional functionality and flexibility. Flexibility is further enhanced by a CPU upgrade path as well as easily ungradable main system memory and hard disk drive.

In one embodiment, a method of positioning or arranging the internal components of a portable computer of a type operable to store data and execute programmed sets of instructions, and being further of a type sized to be operated while being held by a user, is provided. The portable computer comprises a housing forming an interior compartment for housing the internal components of the computer, and further comprises a generally planar main logic board mounted within the interior compartment and having a generally T-shaped configuration. In one embodiment, the main logic board comprises connectors and supporting circuitry for the internal components, and further comprises integral first and second portions, wherein the first portion traverses substantially the entire latitudinal dimension of the internal compartment, and has a longitudinal dimension substantially less than the latitudinal dimension of the internal compartment. The second portion of the main logic board is located adjacent to the first portion, and the latitudinal dimension of the second portion is substantially less than the latitudinal dimension of the internal compartment. The first and second portions together form a main logic board having a generally T-shaped configuration thereby providing voids or cutout regions in the main logic board corresponding to regions within the interior compartment that are not occupied by the main logic board. The generally T-shaped main logic board is mounted within the housing and the desired internal components are operably arranged within the computer's housing. In this manner, components having a relatively large thickness may be housed within the interior compartment without the need for increasing the computer's thickness, as would be necessary for a computer comprising a conventional, generally rectangular main logic board, by locating such components in the areas within the interior compartment not occupied by the main logic board that result from the general T-shape of the main logic board in accordance with the present invention. Also, a greater number of components may be housed within the interior compartment since the cutout regions forming the general T-shape of the main logic board in accordance with the present invention allow components to be stacked within the internal compartment in a manner that is not possible with the conventional generally rectangular main logic boards.

In another aspect, the present invention relates to a portable computer of a type operable to store data and execute programmed sets of instructions, and being further of a type sized to be operated while being held by a user, comprising the generally T-shaped main logic board as shown and described herein. In another aspect, the present invention related to the generally T-shaped main logic board.

In yet another aspect, the present invention relates to a shock mounting system for a portable computer having a flat panel display, such as an LCD display, comprising a shock absorbing member encasing the perimeter of the flat panel display and a metal frame mounted within the interior compartment retaining the shock absorbing member. In one embodiment, the shock absorbing member encasing the flat panel display may be replaced by a plurality of shock absorbing members spaced around the periphery of the flat panel display and engaging the shock absorbing frame.

In yet another aspect, the present invention relates to a shock mounting system for a portable computer having a flat panel display, comprising a shock absorbing member encasing the perimeter of the flat panel display and a metal frame mounted within the interior compartment retaining the shock absorbing member wherein the metal frame forms at least a portion of the peripheral walls housing the computer. In one embodiment, the shock absorbing member encasing the flat panel display may be replaced by a plurality of shock absorbing members spaced around the periphery of the flat panel display and engaging the shock absorbing frame.

It is to be understood that both the foregoing general description and the following detailed description are exemplary and explanatory only and are not restrictive of the invention as claimed.

The accompanying drawings, which are incorporated in and constitute a part of the specification, illustrate various embodiments of the invention and together with the general description, serve to explain the principles of the invention.

BRIEF DESCRIPTION OF THE DRAWINGS

The detailed description of the invention may be best understood when read in reference to the accompanying drawings wherein:

FIGS. 7 and 8 depict embodiments of the generally T-shaped main logic board in accordance with the present invention and exemplary arrangements of internal components in portable computers according to the present invention employing the same;

DETAILED DESCRIPTION OF THE INVENTION

Figure 1:
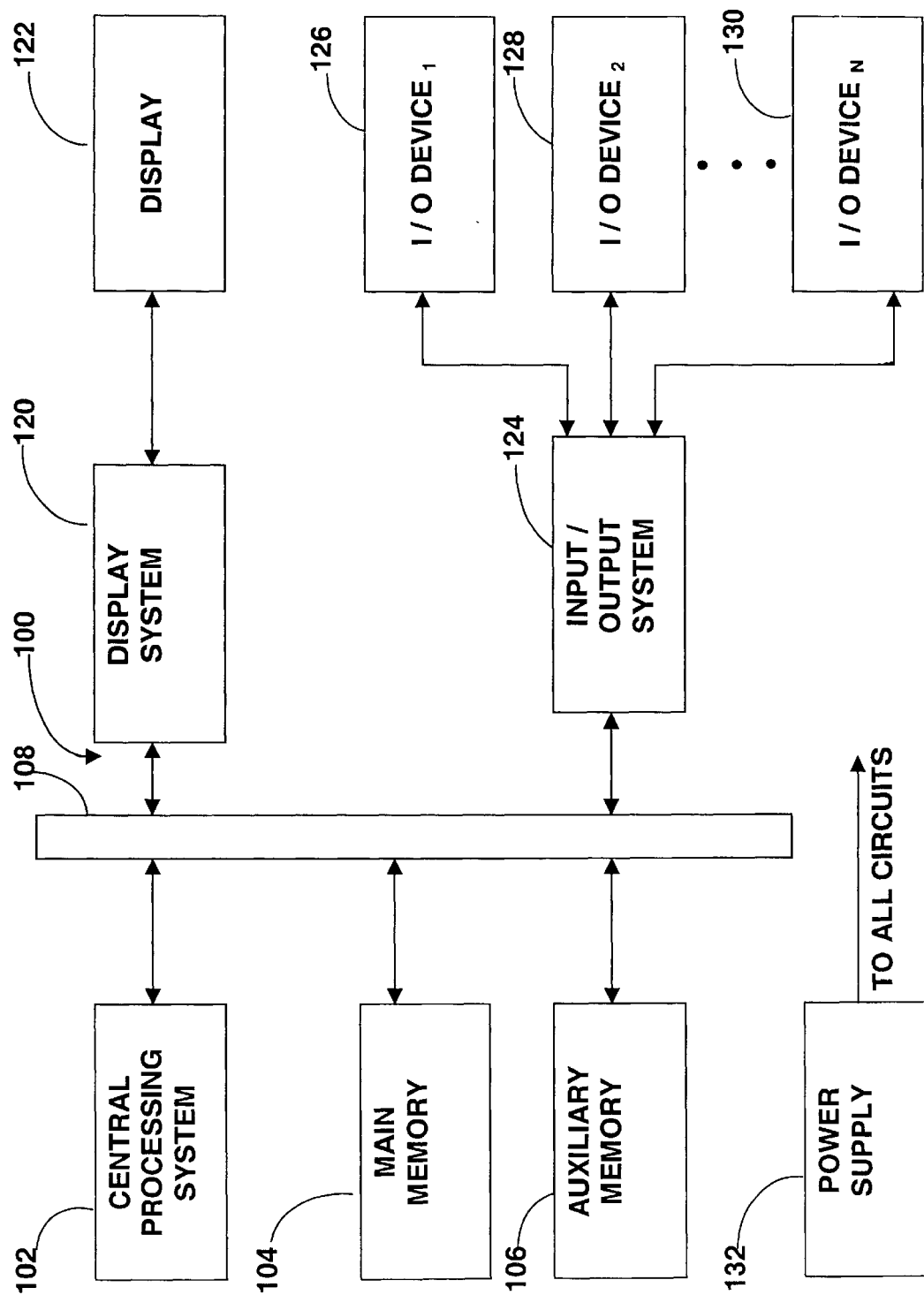
FIG. 1 depicts a computer hardware system operable to embody the present invention.

The present invention provides a multi-featured computer in a small, lightweight, ergonomic system particularly suited for mobile users. Referring to FIG. 1, a hardware system in accordance with the present invention is shown. The hardware system 100 shown in FIG. 1 is generally representative of the hardware architecture of a computer-based information handling system of the present invention. The hardware system 100 is controlled by a central processing system 102. The central processing system 102 includes a central processing unit (CPU) such as a microprocessor or microcontroller for executing programs, performing data manipulations and controlling the tasks of the hardware system 100. The central processing unit is preferably a state of the art processor. In one embodiment, the processor has a 32-bit address bus and a 64-bit data bus. In a preferred embodiment, the processor is a Pentium, Pentium Pro, or Pentium II processor available from Intel Corporation, or may be another like processor having comparable processing power and speed. In an especially preferred embodiment, the processor is user ungradable in the form of a socketed or plug in module.

Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

Other components of the hardware system 100 include main memory 104, and auxiliary memory 106. The hardware system 100 may further include an auxiliary processing system (not shown) as required. The main memory 104 provides storage of instructions and data for programs executing on the central processing system 102. The main memory 104 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. Main memory 104 is preferably in modular format to provide a variety of memory configuration and upgrade options, e.g., comprising surface mount memory chips accommodated on small circuit boards, such as single-in-line memory modules (SIMMs), and more preferably dual-in-line memory modules (DIMMs), and most preferably small outline dual in-line memory modules (SODIMMs). In a particularly preferred embodiment, main memory 106 comprises SODIMM SDRAM modules.

The auxiliary memory 106 provides storage of instructions and data that are loaded into the main memory 104 before execution. The auxiliary memory 106 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). Such ROM based memory is generally employed to store the basic input/output system (BIOS) which provides essential software routines, for example, to test the hardware at startup, start the operating system, support the transfer of data among hardware devices, and so forth. Auxiliary memory 106 may further include one or more mass storage devices. Mass storage devices may be selected from a variety of nonsemiconductor-based memories, including but not limited to magnetic tape, drum, floppy disk, smart card, hard disk, optical laser disk, compact disc read-only memory (CD-ROM), write once compact disc (CD-R), rewritable compact disc (CD-RW, CD-E), digital versatile disc read-only memory (DVD-ROM), write once DVD (DVD-R), rewritable digital versatile disc (DVD-E, DVD-RAM), etc.

In one embodiment, auxiliary memory 106 comprises a hard disk drive and optionally one or more other form of mass data storage. Preferably, the hard disk drive is readily replaceable, interchangeable, or otherwise ungradable.

Other varieties of memory devices are contemplated as well. For example, auxiliary memory 106 may comprise a solid state disk drive which holds data in solid state devices (e.g., RAM) rather than in magnetic storage. The solid state disk drive may employ, for example, any rewritable non-volatile memory such as EEPROM, flash memory, or the like. Alternatively, the solid state disk drive may employ volatile RAM such as DRAM, SRAM, SDRAM, and so forth. When volatile memory is employed, the a battery, such as a backup battery, or other power source may be employed to preserve the data stored in a solid state disk drive. Solid state data storage devices are available, for example, from SanDisk Corporation.

The hardware system 100 may optionally include an auxiliary processing system (not shown) such as a back-end processor (a slave processor subordinate to the main processing system), an additional microprocessor or controller for dual or multiple processor systems, or a coprocessor. Such processors may be, for example, an auxiliary processor to manage input/output, an auxiliary processor to perform floating point mathematical operations, a digital signal processor (a special-purpose microprocessor having an architecture suitable for fast execution of signal processing algorithms), and so forth. It will be recognized that such auxiliary processors may be discrete processors or may be built in to the main processor.

The hardware system 100 further includes a display system 112 for connecting to a display device 114, and an input/output (I/O) system 116 for connecting to one or more I/O devices 118, 120, up to N number of I/O devices 122. The display system 112 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The computer system 100 in accordance with the present invention will comprise a built in display device 114 which may comprise a flat panel display device. Exemplary flat panel devices include, for example, liquid-crystal display (LCD), light-emitting diode (LED) display, gas or plasma display, electroluminescent display, vacuum fluorescent display, or cathodoluminescent (field emission) display. The display device 114 may further comprise an externally located display device that may be operably connected to a port of computer 100 or a port of a docking system in which computer 100 is docked. The external display device may comprise a cathode ray-tube (CRT) type display such as a monitor or television, or a flat panel display as described above.

The built in display device 114 incorporates a touch-based input device (see FIGS. 2–4, reference numeral 212) operable to recognize the location of a touch on its surface. The touch may be a user's finger or, more preferably, a stylus. The touch screen may employ, for example, an infrared grid formed by light emitting diodes (LEDs) around the outer edges of the screen. In preferred embodiments, the touch screen comprises a touch sensitive input device overlaying the display, for example, either through capacitive or resistive switching and sampling techniques to determine coordinates of a point on the touch input surface against which a contact pressure is exerted. The overlay is essentially transparent, such that information displayed on the display screen remains clearly discernible. In one embodiment, the touch sensitive area is activated by an active or passive pen or stylus that may be used to contact a single or a sequence of definable area locations to delineate pen-written data or information. In a preferred embodiment, the pen or stylus is passive. The intelligent contents of information entered via stylus may be interpreted by software contained within the computer 100. Software may include graphics programs for recording and storing graphical data. For example, a signature or other graphical information may be entered by a user, and is digitized, optionally compressed, and stored in memory. Hand written data thus entered may be uploaded to a host network or system for archival purposes. Software may also be provided to allow for signature verification, (e.g., by uploading the recorded data to a centralized host computer or system for comparison, or by comparison of the recorded data to a previously recorded sample that may be downloaded to computer 200). Software may include character recognition programs to permit software interpretation and conversion of hand written data to a computer readable format such as a text or word processing format. It would also be possible, for example, that all or part of the touch screen be selectively configured as a keyboard for manual input of alphabetical or special characters.

In a preferred embodiment, the touch screen may be employed to generate mouse button events, including left and right mouse button emulation. Such emulation may be provided for example, through gestures such as taps and so forth on the touch screen surface recognized by software to emulate mouse button input, by buttons located on the housing 202, virtual on screen buttons, and/or by various combinations of button presses and touch screen gestures.

In one embodiment, a second, small LCD 204 may be provided to provide system status indicators. LCD 204 may be monochromatic and is preferably small, such as an elongate LCD capable of displaying one line of text or other graphical or iconic indicia. Optional LCD 204 may display information such as such as whether an external or internal power source is in use, status of a battery charge or discharge cycle, whether a disk drive is in use, power management features such as LCD brightness, hard disk spin down, and sleep mode indicators, etc. Other information, such as the date and time, may also be provided on optional LCD 204. In an alternative embodiment, a plurality of LEDS located on housing 202 may be employed as system status indicators.

In one embodiment, the present invention provides one or more PC-Card slots for accommodating industry standard PC-Cards (also known as PCMCIA Cards), such as memory expansion cards, hard drives, fax/modems, wireless modems, SCSI adapters, LAN cards, wireless LAN connectors, sound cards, CDROM controllers, tape back up drives, and so forth. Preferably, a type 11 and a type III card slot will be provided. The type 11 PC-Card slot is advantageous in that it is able to accommodate not only the 5 mm thick type 11 cards, but also the original type I card (the availability of which is generally limited to memory expansion cards). The type III card slot accommodate the 10.5 mm thick type III cards, and are intended primarily for use with computers that have removable hard drives, but may also accept one or two type I or type II cards. It is contemplated that PC-Card slots in accordance with future standards, such as PCMCIA type IV, may also be provided.

Power is supplied to the computer 100 via power supply 132, which is representative of any number of power supply types. In one embodiment, power supply 132 is a battery or battery pack, and may further include a backup battery or battery for preserving contents of volatile memory when the power is off. In another embodiment, power supply 132 may be an adapter to adapt AC current to power the unit as well as to charge any batteries or batteries in the unit. In one embodiment, an input power jack may be provided on the housing of the computer for battery charging and/or powering the unit. Alternatively, the AC adapter may be integrated into a docking unit for the computer 100, which may also provide data transfer and communication functions, attachment to peripherals, and so forth.

In yet another embodiment, the power supply 132 may be an external DC power source that provides operating power to the unit as well as providing a battery charging function to any internal batteries or battery packs housed within the unit. The external DC power source may be, for example, a vehicle's electrical system. In one embodiment, an input power jack may be provided that allows the unit to be powered by a vehicle's power supply, for example, as with an adapter that uses a vehicle's cigarette lighter socket. In one embodiment, the external power supply may be integrated into a vehicle docking system that may also provide data transfer and communication functions, and so forth, in addition to providing operating power and/or battery charging functions.

In a preferred embodiment, the power supply 132 comprises one or more smart batteries or battery packs having an integrated microprocessor and which is capable of communicating with a charging unit to provide protection from overcharging or an excessive rate of charge and which is capable of communicating with the computer system 100 to provide information such as temperature, pack voltage or charge/discharge current, and data that may be used to calculate or predict battery characteristics based on the battery's present state and/or stored data pertaining to prior charge/discharge cycles and computer use characteristics of a user, and so on. Such calculations or predictions may include, for example, one or more of the following: the battery's remaining life at the present rate of drain, time to charge the battery, the computer's real-time power requirements, determining whether to enable or disable power management features, and so forth.

Figure 2:
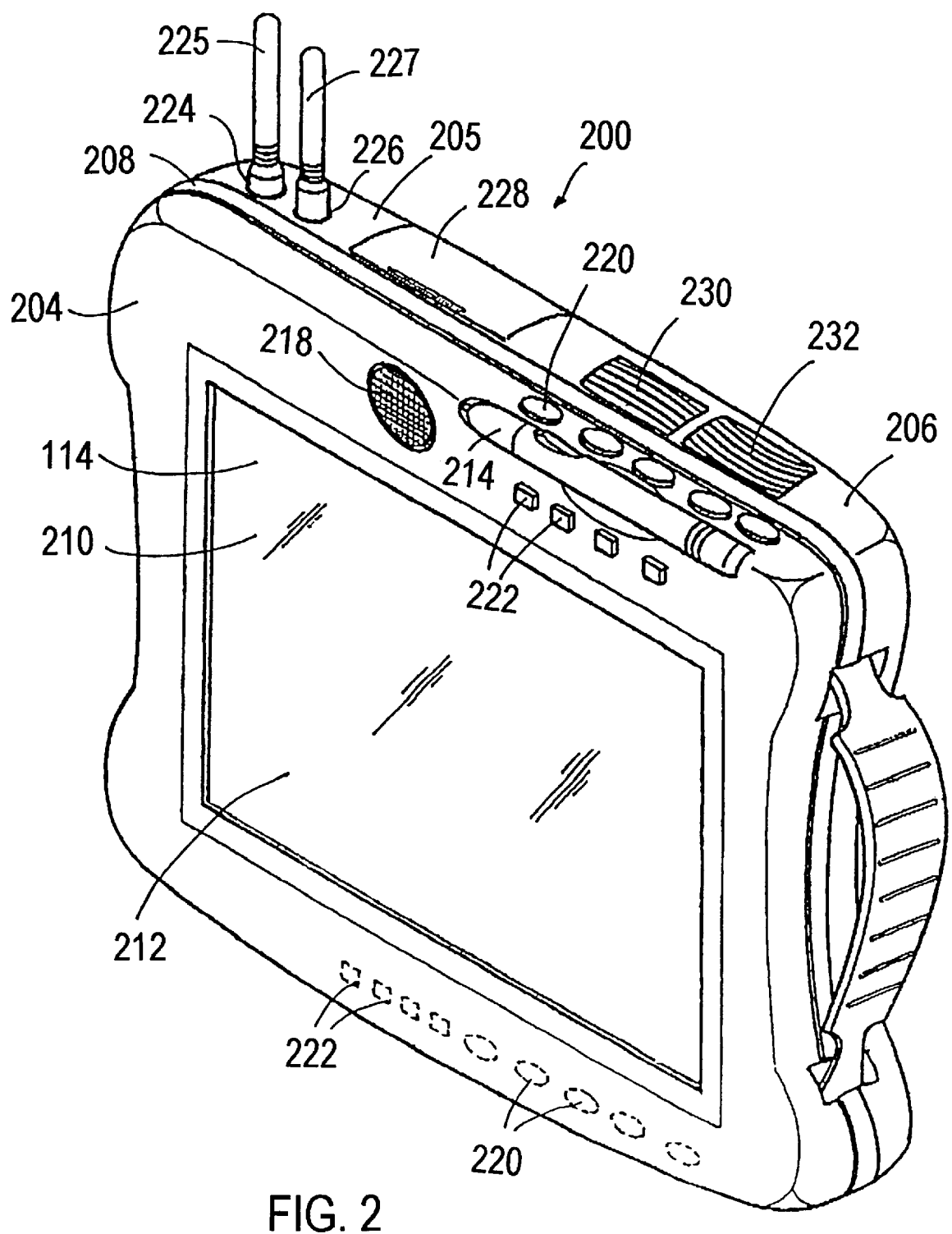
FIG. 2 depicts a portable computer in accordance with an exemplary embodiment of the present invention.

In one embodiment, the portable computer according to the present invention will comprise one or more buttons or switches (see buttons 220 of FIG. 2) located on housing 202 (FIG. 2). The functions of such buttons may include, for example, power on/off switch, processor reset button, and/or a suspend/resume switch. The processor reset button may be of the type that initiates a processor reset by temporarily blocking a "power good" signal. A suspend/resume switch may toggle the computer between "awake" and "sleep" modes. A sleep mode may be provided, for example, for power management purposes, wherein it may be desirable to suspend operation without terminating or shutting down the system. In such cases, power to the system or portions thereof such as the display, hard drive, etc., may be terminated while contents of the RAM are saved, for example, preserved in RAM or, where the entire unit is powered off, saved in nonvolatile memory such as the hard disk drive. Other functions of button or buttons 220 may include, for example, user controls such as volume control for audio speaker 208, LCD brightness, LCD contrast, and so forth.

The input/output system 116 may comprise one or more controllers or adapters for providing interface functions between the one or more I/O devices 118–122. For example, the input/output system 116 may comprise a serial port, such as an RS-232 port, parallel port, including a unidirectional parallel port and, more preferably, a bidirectional parallel port. A parallel connection may support any industry standard parallel port operation, such as IBM Type 1, IBM Type 3, Enhanced Parallel Port (EPP), Enhanced Capabilities Port (ECP), IEEE 1284, and so on, and is preferably a connection that supports both EPP and ECP operation. I/O system 116 may also include ports such as one or more universal serial bus (USB) ports, IEEE 1394 serial bus port, infrared port, network adapter, printer adapter, radio-frequency (RF) communications adapter, universal asynchronous receiver-transmitter (UART) port, etc., for interfacing between corresponding 110 devices. Exemplary I/O devices include, for example, keyboards, including alphabetical, numeric, and alphanumeric keyboards and keypads that may be external or may be modules that mount onto to the housing of the computer or that replace a removable portion or section of the housing of the computer, pointing devices, such as a mouse, trackball, touchpad, joystick, trackstick, or touch screen overlay, infrared transducers, printers, modems, RF modems, including LAN and/or WAN radios, cellular modems, GPS receiver, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, audio speakers, etc. The input/output system 116 and I/O devices 118–122 may provide or receive analog or digital signals for communication between the hardware system 100 of the present invention and external devices, networks, or information sources. The input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and soon), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on.

The various input/output connectors for supporting options may be grouped and arranged together in generally the same region of housing 202 to form input/output panel 210 (FIG. 2). Exemplary connectors include, for example, a serial port, for example, for supporting a tethered scanner or optical reader, an an audio in and out jack, for example, for use with a headset to provide voice input and audio output, RJ-11 jack, Ethernet RJ-45, keyboard and optional mouse input, and parallel port. The keyboard and optional mouse input is preferably a PS/2 port.

In one embodiment, a powered Universal Serial Bus (USB) port is provided. The USB is a serial bus having a bandwidth of 12 Mbits per second that uses a tiered star topology, so that each device attached to the USB has a direct connection with, and is controlled by, the host computer which functions as the USB host controller/root hub. The USB system, which may be implemented in a PCI-based platform, uses 7 bit addressing and thus can simultaneously connect up to 127 peripheral devices.

The computer according to the present invention will preferably provide different levels of docking functionality, ranging from a docking unit providing external power input and data exchange with a host computer or network, to port replication functions allowing the connection of peripherals such as an external display monitor, printer connections, Ethernet, serial port, USB connections, and so forth. External power may be provided by an AC power source or, where a dock is intended for use in a vehicle, a vehicle power supply. A docking antenna connector may be provided to allow the use of a remote antenna, such as a high gain antenna in a vehicle or elsewhere.

In one embodiment, the portable computer according to the present invention will include a local area network (LAN) radio and/or a wide area network (WAN) radio for providing data connectivity to a host system or network. Such data links are known in the art, and include for example, public and private wireless links, circuit switched and packet switched cellular networks, satellite networks, and so forth. Exemplary data services include Cellular Digital Packet Data (CDPD), Mobitex, and Global System for Mobile Communications (GSM) data services, and so forth. In a preferred embodiment, a vehicle will have the capability to communicate via more than one type of data link. For example, satellite and land based data links may be provided, thus allowing, for example, the less expensive land-based communication to be used whenever available, with the more expensive satellite communication being used when necessary to maintain continuous two-way contact.

Figure 8:
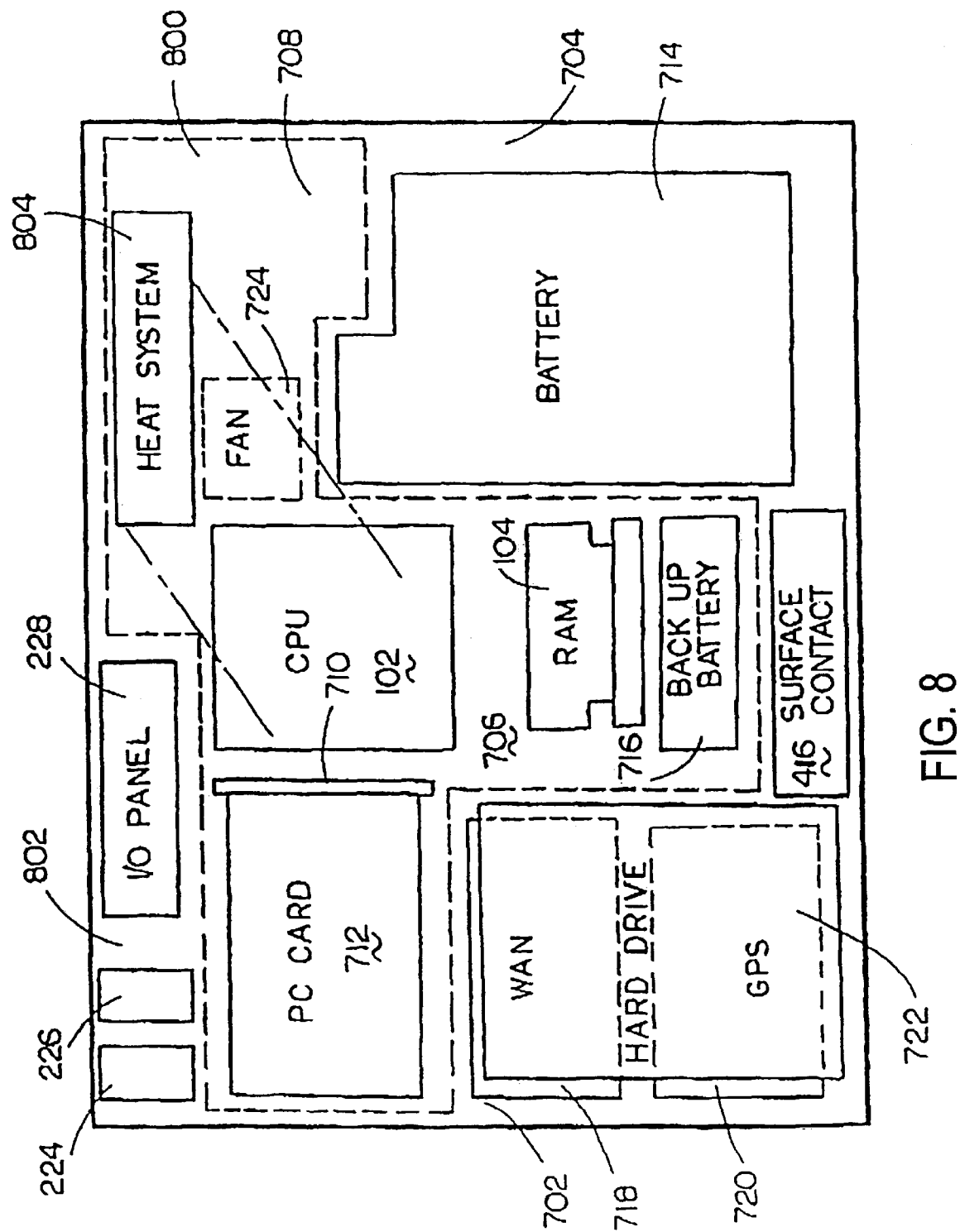

In one embodiment in accordance with the present invention, computer 200 comprises an internal precise positioning means 720 (FIGS. 7 and 8). Precise positioning means will generally comprise a receiver for receiving positioning signals from a satellite network based positioning service. Although the precise positioning means will generally be referred to herein as a GPS receiver, it will be understood by those skilled in the art that the present invention is not limited to any particular positioning means. Exemplary positioning services include, for example, satellite based positioning services such as GPS Precise Positioning Service (PPS), GPS Standard Positioning Service (SPS), Global Navigation Satellite System (GNSS), Global Orbiting Navigation Satellite System (GLOSNASS), GNSS-2, and the like, or ground-based positioning systems such as LORAN, LORAN C, OMEGA, and the like.

The precise positioning means employs a receiver with an antenna to receive the satellite positioning signals (or other positioning signals) to compute the coordinates corresponding to the location, i.e., latitude, longitude, and altitude of the receiver. By continuously determining position at periodic intervals, a vehicle's path can be monitored or stored in memory. The present invention allows position data to be used in conjunction with a software database of geographical information, for example, to provide roads or route information or a map on display 114. By integrating both a wireless link to a WAN and a positioning means, it is only necessary to download to the memory 104 of computer 200 the geographical database information that will be needed for a given route, thus, minimizing the memory storage requirements. For example, the selection of the necessary database information can be performed by route analysis software at the start of a trip. If a vehicle is rerouted while in transit, or if position tracking data indicates that a driver is about to enter a geographic area corresponding to a region for which data has not been downloaded, route analysis software may be used to anticipate such an event and request the appropriate data via the wireless communication link with a central dispatch office. Position information may also be employed to direct the vehicle operator to a given site for fuel, servicing, and the like. Where the positioning means is employed to monitor driver milage or other trip event data, the portability of computer 200 allows vehicle-to-vehicle transfer of such data for a given operator, allowing the system to readily prepare operator payroll, e.g., as where a driver is paid per mile driven, and monitor operator driving time, even though the driver may operate multiple vehicles in a given time period.

Referring now to FIG. 2 there is shown a hand-held computer 200 illustrating one embodiment according to the present invention. The internal components of computer 200, which may be substantially as shown in FIG. 1 and as described in reference thereto, are housed within housing 202. Housing 202 preferably comprises a high impact strength material. Various types of moldable high impact strength plastic materials are known and are generally available. Portions of housing 202 may comprise moldings of rubber, thermoplastic rubber material, or other resilient, impact resistant, shock absorbing material (not shown) bonded to the surface of housing 202, e.g., via a co-molding process. In an alternative embodiment described below in reference to FIGS. 4–6B, a removable resilient covering may be provided. Housing 202 comprises an upper shell 204 and a base shell 206. Upper shell 204 and base shell 206 may be fastened to provide a sealing engagement, for example, by a number of screws through holes in base shell 206 that are arranged to align with threaded posts or bosses formed on the interior of upper shell 204. When aligned and fastened, shell halves 204 and 206 engage a gasket 208 formed of rubber or other polymeric, preferably elastomeric, material. Gasket 208 provides a sealing engagement between shell halves 204 and 206 to provide protection to the internal components from moisture, dust and debris.

Upper housing shell 204 comprises an aperture 210 through which touch input overlay device 212 is accessible and display device 114 is viewable. Display 114 and touch screen overlay 212 are the dominant features on the front (viewable) surface of computer 200. Because of power consumption considerations, and especially since LCD screens typically provide satisfactory viewing contrast under most direct lighting conditions, where a back light is employed, it is preferable to include a selective back light disablement feature that may be manual, controlled by user-operated software, or automatically disabled and enabled depending on available light or remaining battery life. For example, available light may be detected by a photosensor (not shown) located on the surface of housing 202 and the backlighting or LCD brightness adjusted in response thereto. As an alternative or additional scheme, backlighting may be reduced or disabled as a part of a power management scheme, as where backlighting may be reduced or disabled, or screen brightness otherwise reduced, when the battery voltage output drops below a predetermined level or when remaining battery life (e.g., as calculated by power management or intelligent battery software) reaches a predetermined amount. Backlighting may also be automatically temperature compensated to adjust for differences in luminescence over a range of temperatures. For example, the range of temperatures likely to be encountered by the computer 200 during operation is generally from about −4° F. to about 125° F.

Also located on upper shell 204 is a stylus 214. Stylus or pen 214 is preferably attached to housing 202 via a tether 406 (see FIGS. 4 and 5) and a fastening means such as a clip or the like is provided on housing 202 for retention of the pen 214. In a preferred embodiment, a recessed area 216 is provided for retention of pen 214 when not in use so that the pen will be recessed within and preferably will be generally be flush with the surface of housing 202. The pen may be retained within recess 216 by clip or other fastening means. Alternatively, the dimensions of pen 214 and recess 216 may be toleranced to provide a secure yet removable engagement between pen 214 and cavity 216.

Also located on upper housing shell 204 is sound port 218. An audio speaker and microphone (not shown) may be mounted within housing 202. Preferably, a sound port comprising one or more vents or a grille-like structure, or the like, is provided on the surface of housing 202 in order to increase the acoustic transparency of the housing 202, thus facilitating voice input and audio output.

Also located on upper housing shell 204 are user input or system control buttons 220 and status indicator LED array 222. Input buttons 220 may provide any of a variety of functions as detailed above. Again, such functions include, for example, power cycling, processor reset, display brightness and contrast control, cursor control or mouse emulation including mouse click emulation or toggling between primary and secondary (context) mouse button click emulation, toggling between a sleep or suspend mode and the active mode, and so forth. An LED array 222 may be employed to provide a visual indication of system status, such as battery state, whether an external or internal power source is in use, the status of a battery charge or discharge cycle, whether a disk drive is being accessed, an indication of sleep or suspend mode, and so forth. In one embodiment, housing 202 may be marked with text or graphical indicia indicating the function of each status indicator LED. In another embodiment, LED array 222 may be replaced with a small LCD display (not shown) as described above. Button array 220' and LED array 222', shown in phantom lines, depict alternate locations for button array 220 and LED array 222.

In the embodiment shown in FIG. 2, base shell 206 is shown with antenna connectors 224 and 226, and corresponding antennae 225 and 227, I/O panel 228, air intake vent 230 and air exhaust vent 232. FIG. 2 illustrates a preferred embodiment wherein the above-described vents and connectors are located on the top surface 205 of base shell 206. In this manner, computer 200 may be docked in either a docking unit mounted on a horizontal surface, such as a table or shelf mounted docking unit, or a wall mounted docking unit with all connectors and vents remaining accessible and unobstructed.

Antenna connectors 224 and 226 allow antennas 225 and 227 to be removably attached to computer 200. A plurality of antenna connections is preferably provided because the computer 200 according to the present invention will most advantageously comprise more than one wireless data link. Because the wireless data links employed may be selected from any number of wireless data link types, and because it may be desirable to replace the radio transceivers, for example, as a part of an equipment upgrade or modification, the use of removable antennas in accordance with the present invention proves advantageous in allowing a user to provide properly matched antennas for the types of wireless receiver or transceiver cards or modules employed.

I/O panel 228 is depicted as being located on the top surface 205 of computer 200 and, as detailed above, provides various connectors for external peripheral devices. I/O panel is covered with a hinged door that opens to reveal one or, preferably, more data or communication ports. The ports included may be selected from any one or more ports providing external connectivity as described herein, including, but not limited to, a RJ-type connectors, coaxial (e.g., LAN) connectors, fiber optic cable connectors, serial port connectors such as RS-type connectors, parallel port connectors as herein described, USB ports, an IEEE 1394 port, and so forth, or any combinations thereof. The ports are accessible via an opening in housing 202 that is covered by a hinged door when the I/O panel is not in use. In one embodiment, the opening in housing 202 reveals a generally sealed cavity to protect the interior of computer 200 from moisture or other environmental contaminants such as dust and debris. In one embodiment, the sealed cavity 228 comprising recessed I/O ports further comprises four peripherally raised walls extending from the recessed panel to the opening in housing 202. In one embodiment, the recessed panel and peripherally raised walls are integrally formed with housing 202. In another embodiment, the peripherally raised walls are integrally formed with housing 202 and the recessed panel 228 is separately formed and removable therefrom. The panel may be attached to the peripherally raised walls by fasteners, such as screws engaging holes or bosses formed within the peripherally raised walls and holes or bosses formed within the recessed panel. A seal such as a gasket or the like, optionally having an adhesive on either side or both sides, may be provided to provide a further sealing engagement between the panel and the peripherally raised walls forming the recessed cavity. By employing a separately formed panel, the ports may be readily upgraded or interchanged. An optional additional member overlying the recessed panel with openings for the recessed port connectors may be provided for additional protection from the environment. In one embodiment, the -housing, peripherally raised walls, and the recessed panel may each be separately formed and may be attached to form the recessed cavity by fasteners such as screws holes or bosses formed within housing 202, the peripherally raised walls, and the recessed panel.

The hinges described in the above described embodiments of I/O panel 228 may be any type hinge, including a piece of flexible material, such as plastic (e.g., Kevlar® or the like), engaging the I/O panel door and any other portion of the recessed cavity, such as housing 202, the peripherally raised walls, or other affixed member within the recessed cavity. Alternatively, the hinge may be formed by one or more pins engaging holes or latches in the door and either the housing or peripherally raised walls of the recessed cavity. The door may be retained in the closed position by aligned hook and loop fasteners or by latches, hooks, or protrusions on the hinged door that engage or otherwise provide a snap fit with housing 202 or some other portion of the recessed cavity. In one embodiment, a seal, such as a gasket, may be provided between the hinge door and the opening of housing 202 to protect the ports from dust or moisture and to prevent the door from rattling.

Air is drawn into the interior of housing 202 by an internally located fan (see FIG. 7, reference numeral 724) through vent 230 and air exits housing 202 via vent 232, thus creating a passageway for outside air to provide cooling for the interior components of computer 200, most notably CPU 102 (FIG. 1).

Figure 3A:
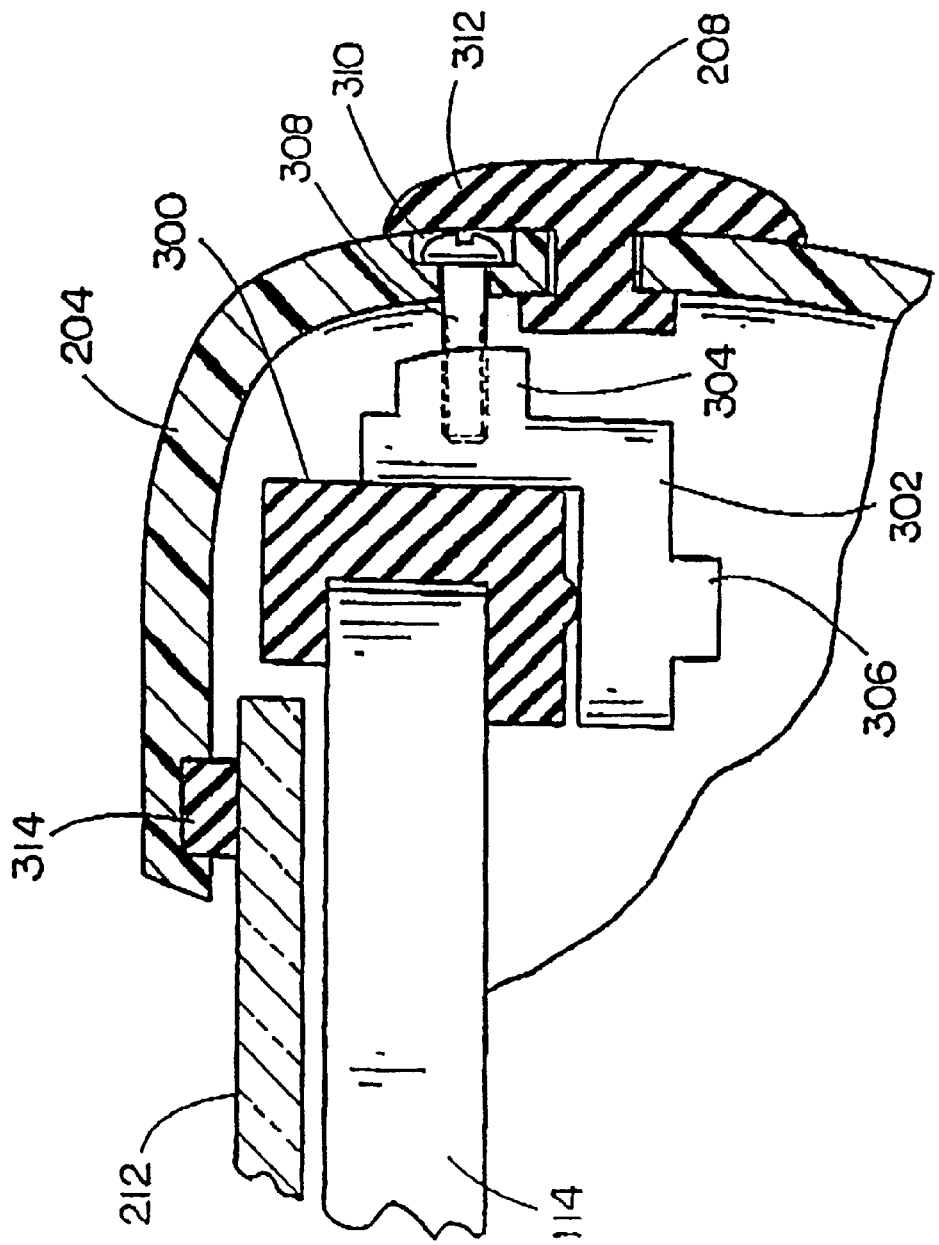
FIG. 3A depicts a cross-sectional view of a flat panel display mounting system according to the present invention.

Referring now to FIG. 3A, there is shown in cross-sectional view an exemplary means of mounting LCD 114 within the housing 202 of a computer such as computer 200 as shown in FIG. 2. LCD 114 is shown as being surrounded by a generally rectangular shock absorbing frame 300. Frame 300 is shown as having a generally U-shaped cross-section encasing the perimeter of LCD 114. Shock absorbing frame 300 may comprise a foam, rubber, elastomeric, thermoplastic, or gel-type material. Shock absorbing frame 300 may optionally be fastened to LCD 114 by means of an adhesive or the like. Shock absorbing frame 300 rests within a metal frame 302 having a generally L-shaped cross section. The L-shaped cross section is formed by a rabbet-type channel extending around the perimeter of metal frame 302 in which shock absorbing frame 300 and LCD 114 are retained. Metal 302 is preferably constructed from a metal having a high strength to weight ratio, and most preferably, is constructed from a magnesium alloy. Magnesium alloys having a high strength to weight ratio are generally known to those persons skilled in the art. Magnesium alloy frame 302 may further comprise structural ribs 304 and 306 to provide increased rigidity of the frame. Alternatively, structural ribs may be replaced by a plurality of projections or mounting bosses. Magnesium frame 302 is suspended within upper housing shell 202 by means of a plurality of fasteners 308 spaced around the perimeter of magnesium frame 302. Fasteners 308 may be pins, screws, and the like, and extend through a series of openings 310 in upper housing shell 204 aligned with corresponding holes in projections or rib 304 of frame 302. Opening 310 may optionally further include additional shock absorbing means. For example, opening 310 may incorporate a flexible, compliant, or otherwise shock absorbing grommet, bushing, ferrule, or the like. FIG. 3A depicts one embodiment according to the present invention wherein gasket 208 comprises an enlarged outer portion 312 that extends to cover holes or openings 310 in housing shell 204 to provide protection from moisture or other environmental contaminants. In alternative embodiments, individual coverings may be employed for covering openings 310, such as shown and described in reference to FIGS. 3B and 3C. Mounted directly over LCD 114 is touch screen overlay 212 comprising a touch sensitive input means and a chemically strengthened glass panel. Upper housing shell 204 forms a bezel retaining touch screen overlay 212, with the region of contact between upper shell 204 and overlay 212 comprising gasket 314 to form a sealing engagement there between. It will be recognized that metal frame 302 may serve as a convenient electrical ground for the computer and may also serve as an electrical shield or extension thereof. Metal frame 302 may further be employed as a mount for the main logic board (MLB).

Figure 3B:
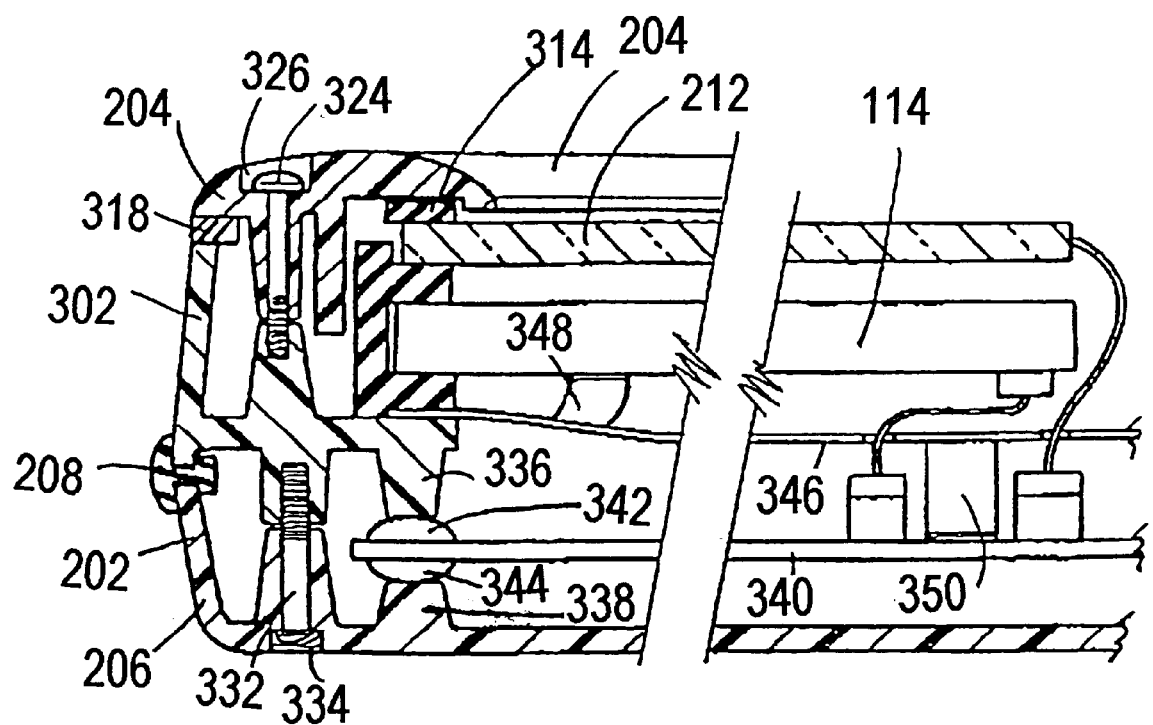
FIGS. 3B–3D depict various embodiments of the flat panel display shock mounting system and the main logic board mounting system according to the present invention.

FIG. 3B depicts an alternative embodiment of a computer according to the present invention employing a midframe member of housing 202 that engages upper housing shell 204 and base housing shell 206. Midframe member may be fashioned of the same material as upper shell 204 and base shell 206, or in an alternative embodiment, may be formed of a magnesium alloy or other metal. Upper housing shell 204 forms a bezel like engagement with touch panel 212, with a sealing engagement being provided by a gasket or seal 314. Upper shell 204 may further comprise an optional integrally formed stiffening rib 316. A gasket 318 is provided to provide a sealing engagement between upper shell 204 and midframe member 302. It will be recognized that the position of gasket 318 may vary. For example, in an embodiment not shown, upper shell 204 may comprise a peripheral extension forming part of the side wall, thereby altering the position of gasket 318. Midframe member 302 and upper frame 204 are adjoined via aligned bosses 320 and 322 and may be fastened by a fastener 324, which may be a screw or the like, extending through housing shell 204. It will be recognized that although only one pair of aligned bosses 320 and 322 are shown, a plurality of such pairs bosses are employed, preferably four or more, and are spaced around the periphery of the computer. A seal or covering 326 may optionally be provided over fastener 324 to protect the unit from moisture or other environmental contamination. Seal or covering preferably is of the type having an opening that provides protection from the environment and that also allows insertion of a tool, such as a screw driver, for removal of fastener 324.

A shock absorbing frame 300 having a generally U-shaped cross section is fastened to midframe member 302 and provides shock absorbing retention of LCD module 114. Touch panel 212 is supported over display 114 by engagement between shock absorbing frame 300 and gasket 314.

Base shell 206 and midframe member 302 are adjoined by aligned bosses 328 and 330 and may be fastened by a fastener, such as screw, 332 in the same manner as described above with respect to fastener 324. Again, it will be recognized that although only one pair of aligned bosses 328 and 330 are shown, a plurality of such pairs of bosses are employed, preferably four or more, and are spaced around the periphery of the computer. An optional sealing member 334, similar to sealing member 326, described above, may be provided to further seal the opening through which fastener 332 extends.

Midframe member 302 and base housing shell 206 further comprise bosses 336 and 338, respectively, that are sized and aligned to capture main logic board (MLB) 340 there between. Again, it will be recognized that although only one pair of aligned bosses 336 and 338 are shown, a plurality of such pairs of bosses are employed, preferably four or more, and are spaced around the periphery of the computer. A sealing engagement between midframe member 302 and base shell 206 is provided by gasket 208. In a preferred embodiment, bosses 336 and 338 engage optional flexible bushings, grommets, or the like, 342 and 344, respectively. The grommets or bushings 342 and 344 may be fashioned from rubber or other elastomeric or resilient material, and act as a suspension for MLB 340, thereby allowing movement of the board without creating excessive loads that may cause stress fatigue, pin breakage, fractures, and the like on the printed circuit board, thereby prolonging circuit board life.

Shielding member 346 may comprise a sheet of metal foil, or a metal coated plastic sheet, such as aluminum on Mylar®, or the like, and may be grounded, e.g., to the chassis of the computer by electrically coupling shielding 346 thereto. Shielding member 346 serves to isolate the computer circuitry from outside electrical interference as well as preventing the computer from becoming a source of electromagnetic interference. Shielding 346 may comprise conductive tabs 348 and 350 for connecting shield 346 to LCD 114 and MLB 340. In one embodiment, wherein midframe member 302 is made from a magnesium alloy or other metal, midframe member may be employed to provide additional shielding of the unit by electrically coupling midframe member 302 to shielding 346, or to any other grounded point. A metal midframe member also provides a convenient electrical ground for the computer.

Figure 3C:
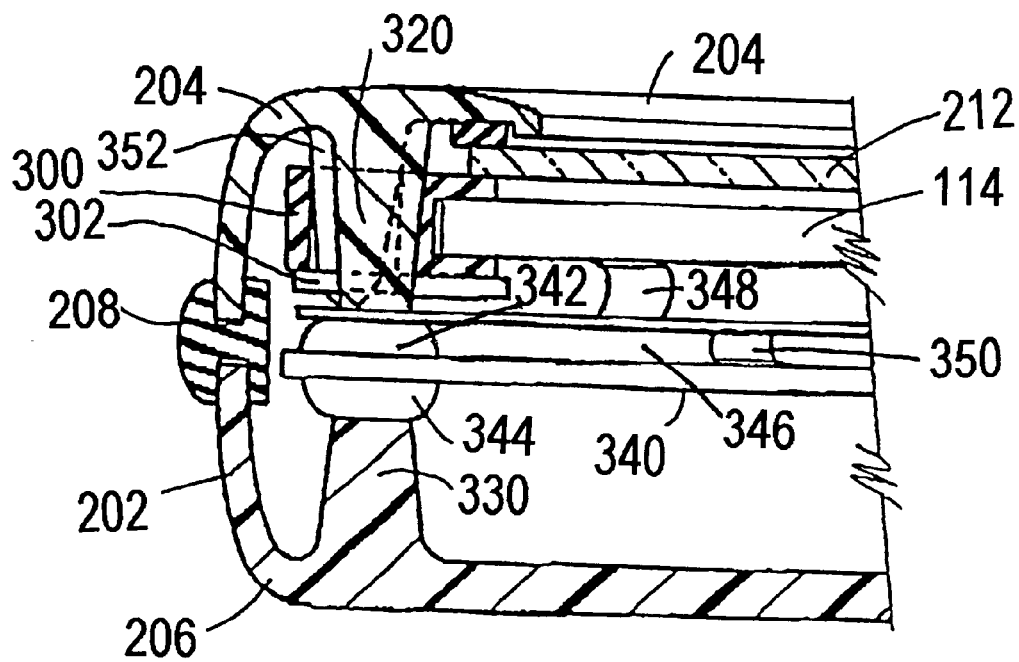
Figure 3D:
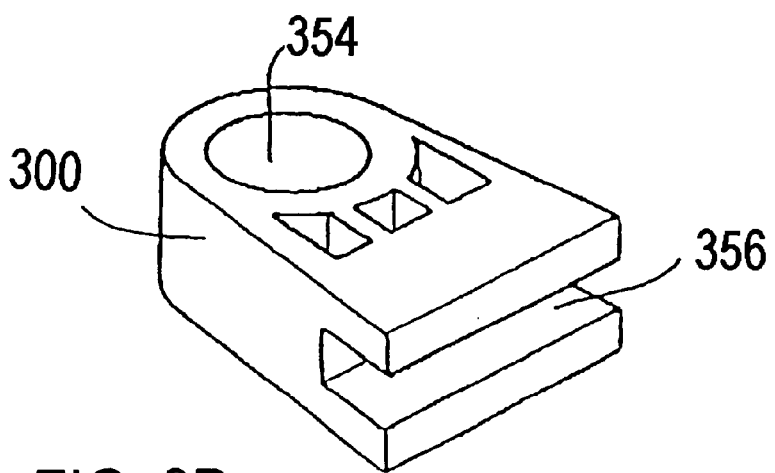

FIG. 3C depicts an alternative method of retaining LCD 114 and MLB 340 within housing 202. Housing 202 is formed by upper shell member 204 and base shell member 206. A sealing engagement between the two shell members 204 and 206 is provided by gasket 208. Base shell 206 and upper shell 204 are adjoined by aligned bosses 320' and 330' and may be fastened by a fastener, such as a screw, (not shown) in the same manner as described above with respect to fasteners 324 (FIG. 3B) and 332 (FIG. 3B). Again, it will be recognized that although only one pair of aligned bosses 320' and 330' are shown, a plurality of such pairs of bosses are employed, preferably four or more, and are spaced around the periphery of the computer.

Bosses 320' and 330' additionally function to capture main logic board (MLB) 340 there between in a manner similar that shown and described above by way of reference to FIG. 3B. In a preferred embodiment, bosses 320' and 330' engage optional flexible bushings, grommets, or the like, 342 and 344, as described above, and act as a suspension for MLB 340, to thereby prolong circuit board life.

A metal LCD support frame or bracket 302' is provided and may be affixed to mounting boss 352. Support bracket 352 and boss 352 engage a plurality of shock absorbing members 300' via opening 354 (FIG. 3D) in member 300'. Shock absorbing member 300' is depicted in greater detail in FIG. 3D. Shock absorbing member 300' has a generally U-shaped opening 356 that is sized to provide shock absorbing retention of LCD module 114. Touch panel 212 is supported over display 114 by engagement between shock absorbing member 300' and gasket 314. In the view depicted, only a single representative boss 352 and shock absorbing member 300' are shown, however, it will be recognized that a plurality of such are to be employed in accordance with the present invention, preferably four or more, located at various positions around the periphery of the computer.

A shielding member 346 may also be provided. Shielding member 346 may comprise a sheet of metal foil, or a metal coated plastic sheet, such as aluminum-Mylar®) sheets, or the like, and may be grounded, e.g., to the chassis of the computer by electrically coupling shielding 346 thereto. Shielding member 346 may comprise conductive tabs 348 and 350 for connecting shield 346 to LCD 114 and MLB 340. In one embodiment, the metal LCD bracket 300' may be employed as a further extension of the shielding by electrically coupling bracket 300' to shielding member 346 or to any other grounded point.

A further embodiment (not shown) is described by way of reference to the above described embodiments according to the present invention wherein a metal frame is employed for LCD mounting. In such embodiments, such as the exemplary embodiments of FIGS. 3A–3D, the metal frame may optionally be thermally coupled to the CPU to provide a heat dissipation function in addition to the strengthening and shock absorbing functions. In this embodiment, the metal frame comprises or is otherwise thermally coupled to a heat sink such as a metal plate, which is, in turn, is thermally coupled to the surface of the processor. Since the metal frame is intended to absorb external mechanical impacts, such as may result dropping or other rough treatment, it is desirable that the heat sink be coupled to the processor by a thermally conductive member that is also shock absorbing, such as a thermally conductive foam, gel, or the like. In this manner, thermal conductivity between the processor and the metal frame may be achieved while mechanically insulating the processor from physical shock that may otherwise damage the processor chip or leads.

Figure 4:
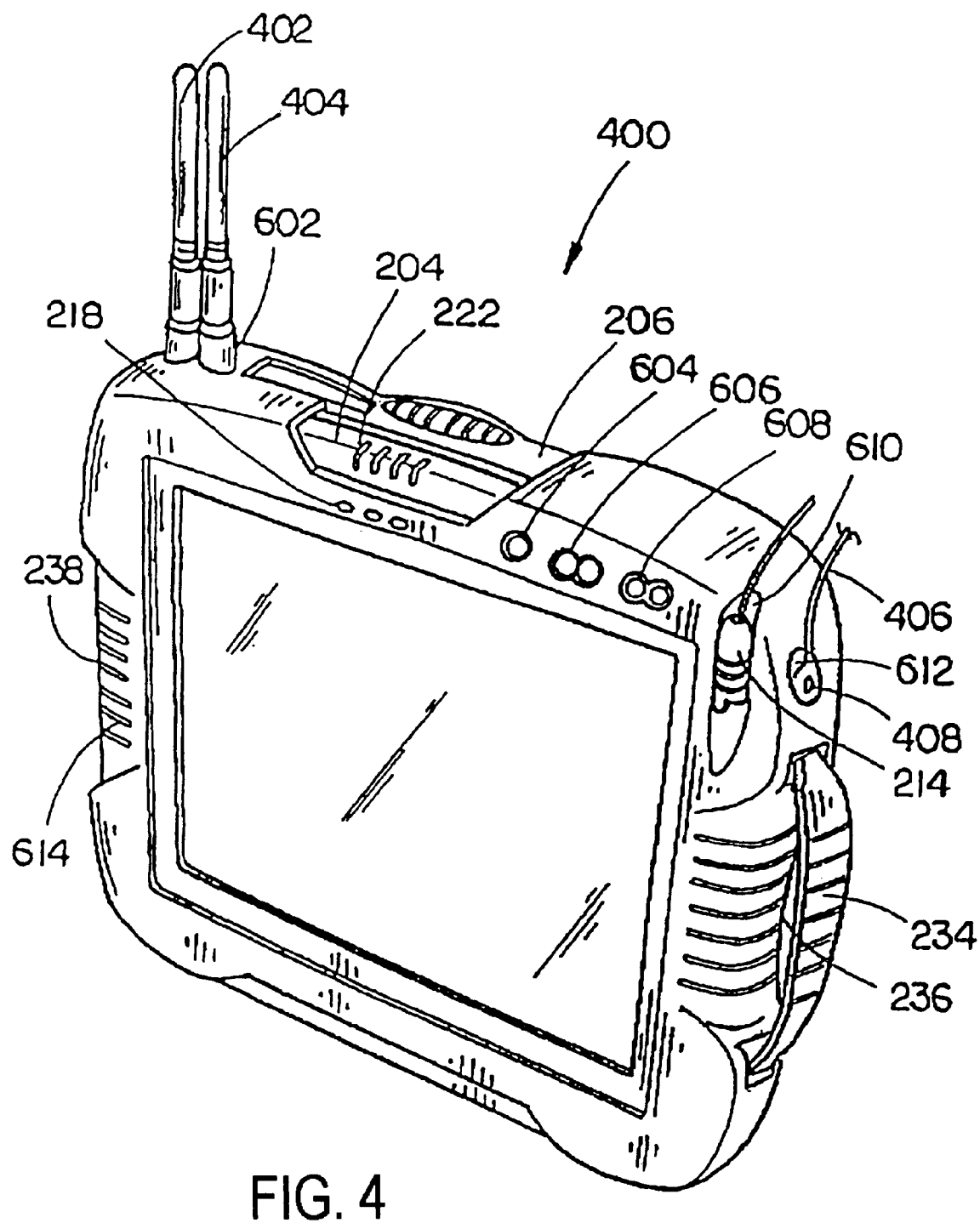
FIGS. 4 and 5 illustrate an alternative embodiment of the portable computer according to the present invention.
Figure 5:
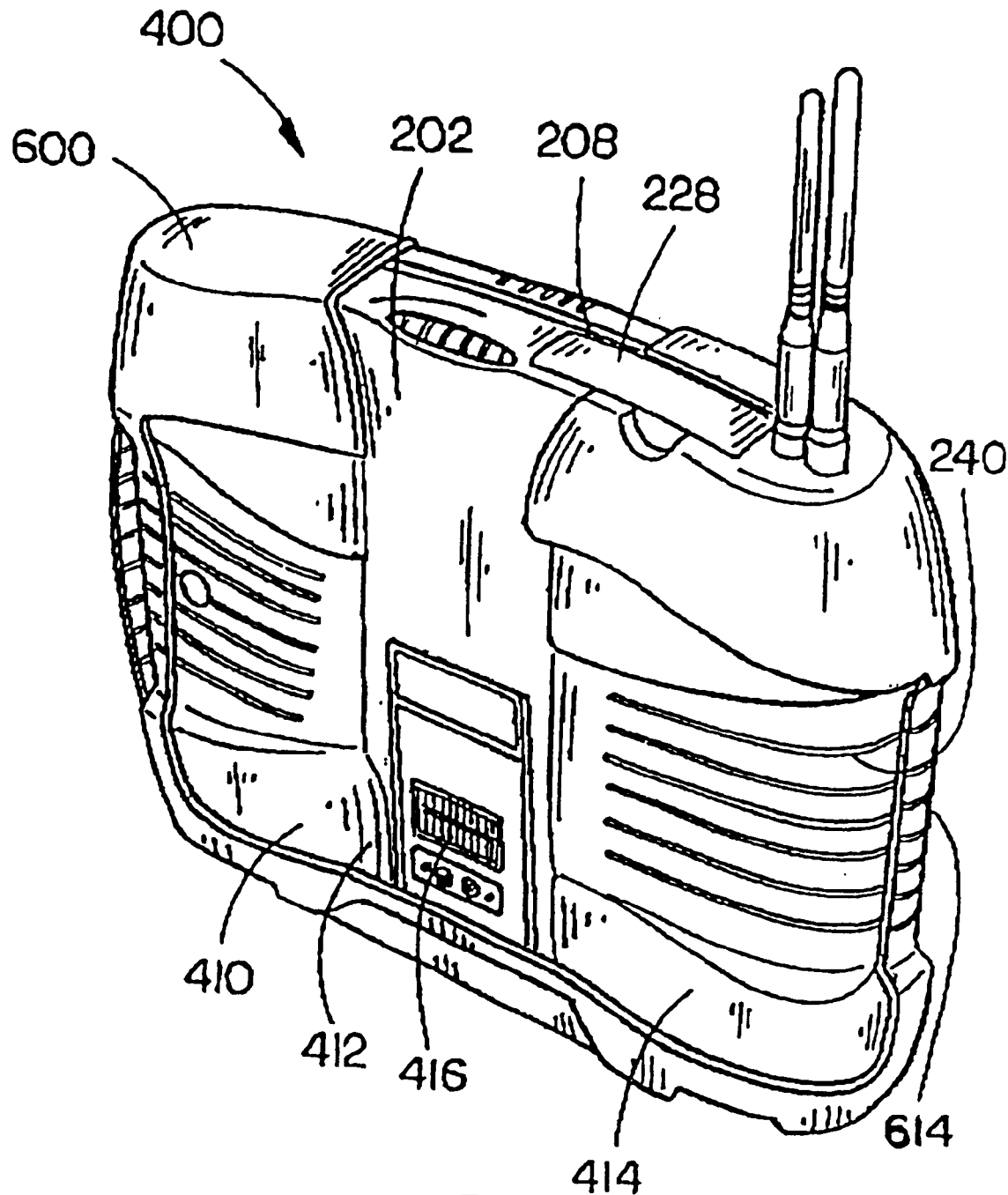
Figure 6A:
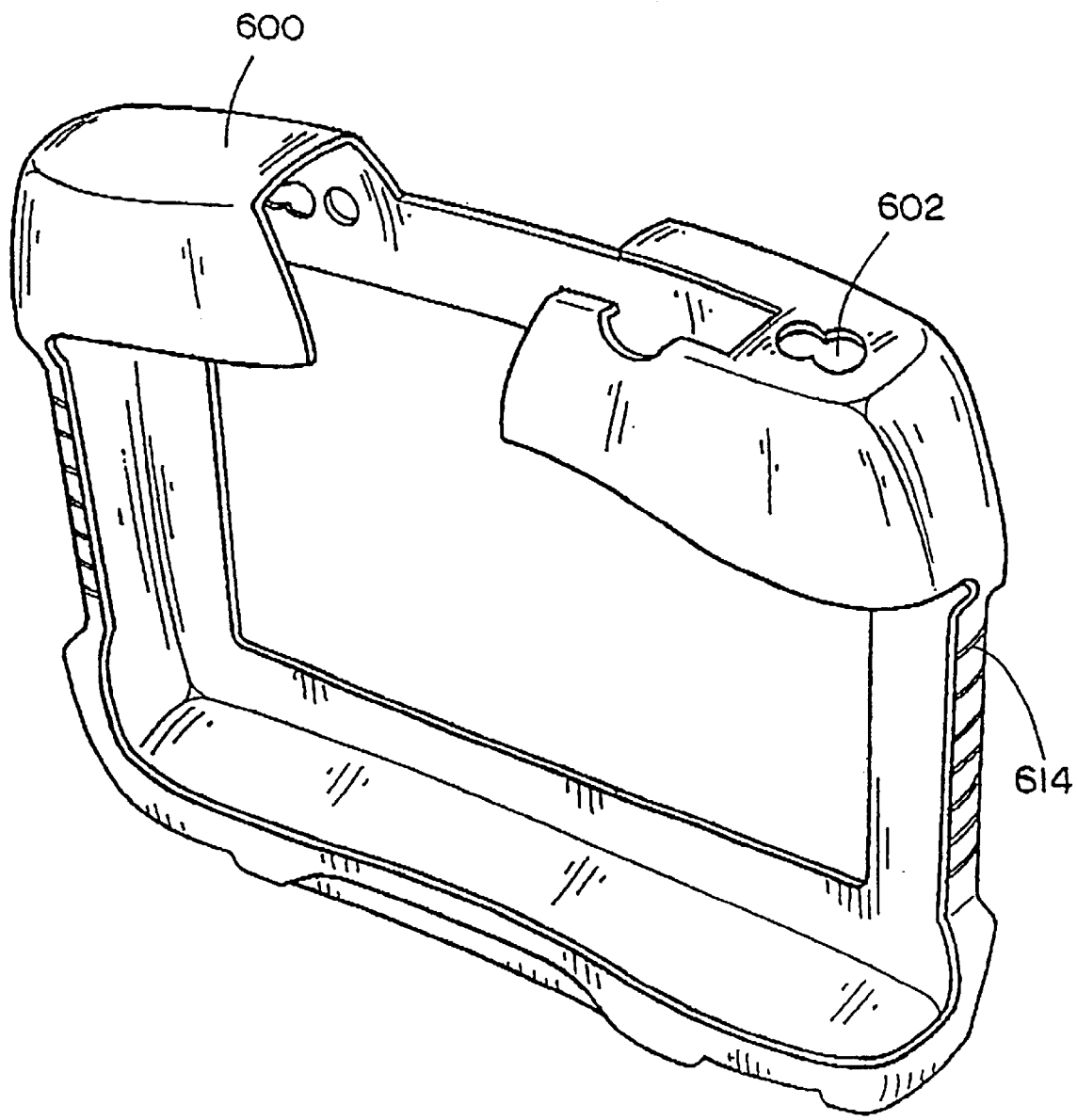
FIG. 6A illustrates an optional stretch over shock absorbing exoskeleton in accordance with the present invention which may be employed to provide a portable computer with additional ruggedization.
Figure 6B:
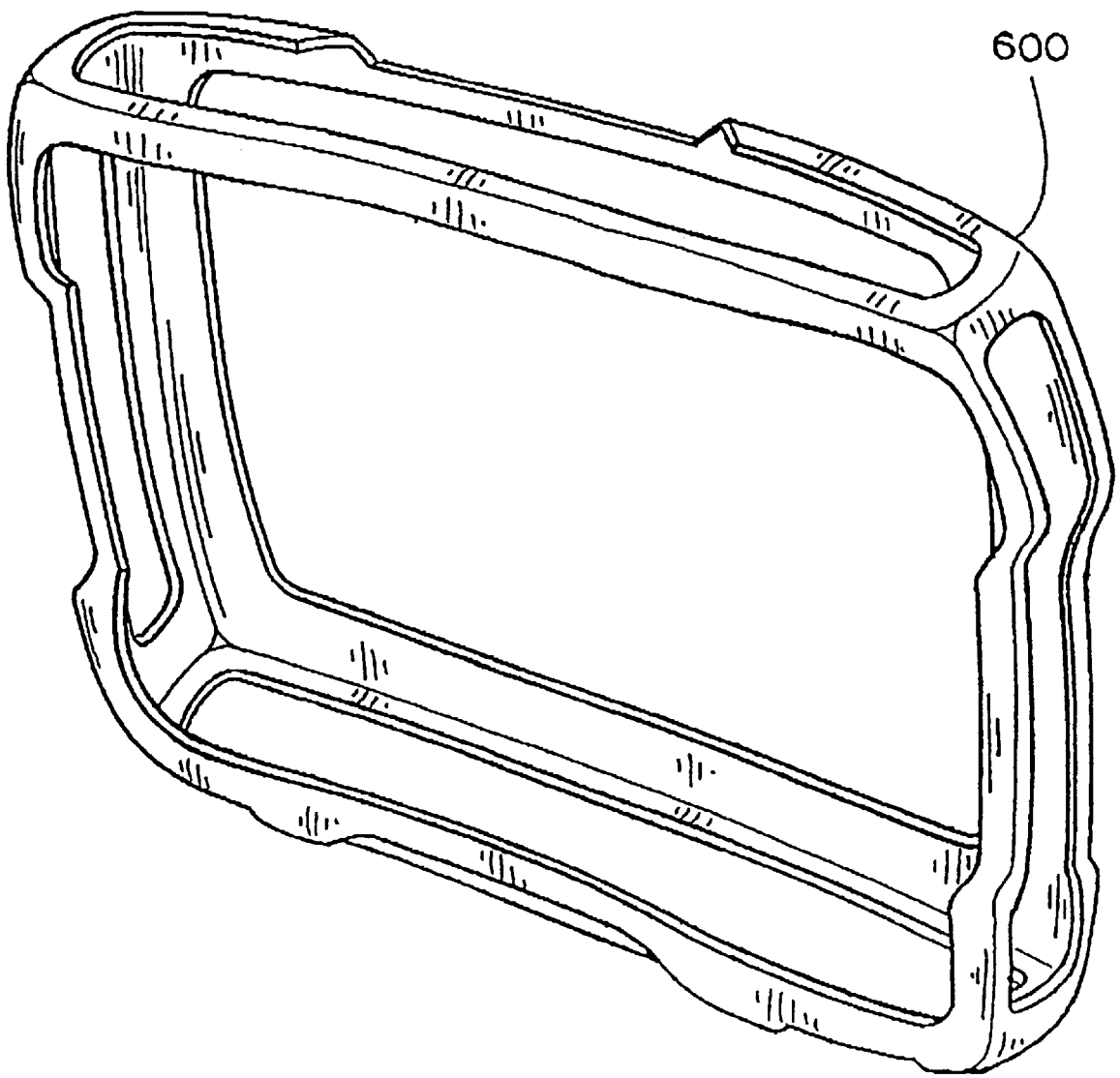
FIG. 6B illustrates another embodiment of the shock absorbing exoskeleton according to the present invention.

FIGS. 4 and 5 show an alternative embodiment of the hand-held computer according to the present invention. Computer 400 comprises a housing 202 encasing the internal components. Housing 202 comprises an upper shell 204 and base shell 206. A sealing engagement between upper shell 204 and base shell 206 is provided by a gasket 208. Computer 400 is shown with a shock absorbing cover 600. Shock absorbing cover 600 is preferably removable and in a most preferred embodiment, is removable as a single piece. FIG. 6A shows shock absorbing cover in greater detail. Cover 600 may be comprise any shock absorbing material such as rubber or other elastomeric materials, foams, gels, cloth, or other resilient or padded material. Cover 600 may be sized to provide a stretch fit over housing 202 of computer 400 to provide secure retention thereon. Cover 600 will cover the corners and sides of computer 400 while leaving access to all components present on the surface of housing 202. An additional embodiment of the shock absorbing cover is depicted in FIG. 6B, depicting cover 600' that provides protection to all corners and edges of the computer.

Referring again to FIGS. 4 and 5, antennae 402 and 404 may be connected to antennae connectors (see reference numerals 224 and 226 of FIG. 2) through opening 602. Alternatively, rather than a single opening 602, discrete openings for each antenna may be provided. Similarly, openings 604, 606, and 608 in cover 600 may be provided for buttons or groups of buttons, such as user input or control buttons 220. In one embodiment (not shown), discrete openings may be provided for individual buttons. In another embodiment, a single opening may be provided to expose the entire array of buttons, such as button array 220. In another embodiment, a single cutaway region (not shown) in cover 600 may be provided to expose the entire array of buttons, such as buttons 220. Likewise, aperture 610 in cover 600 may be provided for stylus 214 and aperture 612 is provided to allow attachment of tether 406 directly to housing 202. Tether 406 is preferably removably attached to housing 202 via a fastener 408, such as a screw, pin, or the like, to allow ease of replacement or removal and reattachment on the opposite side for left handed use. Other features that are unobstructed by cover 600 are I/O panel 228, status indicator LEDs 222 or status indicator LCD (not shown), and sound port 218.

In one embodiment, cover 600 may be color coded or otherwise contain graphical and/or textual indicia thereon. For example, by providing a removable cover 600 rather than an integrally formed shock absorbing material, the external appearance of computer 400 becomes readily customizable. For example, cover 600 may be imprinted with the name or logo of a company. Within a company, markings such as a textual, numerical, or color coding scheme may be provided to identify the computer, the user, or the department to which the unit belongs.

In an embodiment not shown, cover 600 may further include one or more hinged doors operable to covering display 114 when the computer is not in use. In one embodiment, the doors may be flexible to allow wrapping of the doors to the back of the computer when the computer is in use. The doors may be retained in the closed position or the wrapped back open position by aligned hook and loop fasteners, or mating clips or latches, and so forth.

As depicted herein, in a preferred embodiment, housing 202 may have a hand strap 234 attached thereto and, in an especially preferred embodiment, housing 202 comprises curved or otherwise shaped areas 236 and 238 for accommodating a user's hand between hand strap 234 and housing 202. Hand strap 234 is advantageously adjustable to accommodate different hand sizes. As shown herein, computer 400 has inset or cutaway regions 236 and 238 on each side of computer 400. Cutaway gripping regions 236 and 238 may be an integrally formed part of housing 202, or alternatively, may be formed by varying the thickness of protective cover 600. Specifically, by increasing the thickness of cover 600 in the corner regions, inset gripping regions 236 and 238 may be formed, as well as providing increased protection from dropping or other rough treatment. In one embodiment, hand strap 234 may be attached to either side to accommodate both left- and right-handed users. Advantageously, housing 234 and/or cover 600 also have optional molded ridges 240 and 614 in the gripping regions 236 and 238, that serve not only an aesthetic function, but also enhance the roughness of the housing 202, thus providing a better grip adhesion and decreasing the risk that computer 400 will slip from the hands of an operator. Alternatively, ridges 240 and 614 could be molded grooves.

Referring now to FIG. 5, there is shown the back surface 410 of base shell 206 of computer 400. Back surface 410 of base shell 206 comprises doors or panels 412 and 414 that sealingly engage with base shell 206. Panels or doors 412 and 414 are removable or may be opened (e.g., by means of a latch fastener or a hinged fastener (not shown) attaching door 412 or 414 to base shell 206) to provide access to the interior of computer 400.

In one embodiment, panel 412 comprises a battery compartment door and may be removed or opened to exchange batteries, remove batteries for recharging in an external charging unit, etc. In one embodiment, panel 412 may be an integral part of the housing or casing of a battery or may otherwise be attached to the battery. Panel 414 comprises an internal access door to allow ease of adding-or exchanging internal components.

Also depicted on back surface 410 of base shell 204 is surface connector 416, which is positioned to mate with complementing electrical contacts on a docking unit to provide electrical interconnection between the computer 400 and the dock to allow charging of internal battery 132 or operation of computer 400 from an internal power source. Connector 416 also provides a connection for data transfer between computer 400 and a host computer system or computer network. Surface contacts 416 will typically be located on the bottom or back of computer housing 202, and are depicted as being located on the back of computer 200 in the embodiment of FIG. 5. The surface contacts 416 will generally be flush with housing 202 or slightly recessed therefrom. Surface contacts 416 are positioned so as to be aligned with complimentary mating contacts on a docking unit, and are operable to provide a connection for charging an internal battery and optional backup battery, and to provide a data communication link between the computer 400 and a host computer system or network.

FIGS. 7 and 8 illustrate exemplary internal arrangements of components according to embodiments of the present invention wherein a generally T-shaped main logic board (MLB) is employed. The term main logic board or MLB refers to the main circuit board of a computer system containing the primary components thereof. As is understood by those persons skilled in the art, the main logic board will generally contain the processor, main memory, support circuitry, and bus controller and connector.

The use of a T-shaped MLB in accordance with the present invention allows the components of the computer according to the present invention to be housed internally within an enclosure or housing having substantially a uniform thinness. It will be understood that the present invention does not require that the computer in accordance with the present invention be perfectly flat and, indeed, it may be desirable, e.g., for aesthetic reasons, ergonomic reasons, or both, to provide some contour to the shape of the computer housing. In other words, the T-shaped MLB according to the present invention allows the housing to accommodate the internal components of the computer without the need for providing internal compartments or cavities for housing internal components that would create bulges, bumps, or projections on one or more portions of the housing. By increasing the computer's thinness and allowing for the absence of such bulges on the computers housing, a computer having enhanced ergonomics and increased functionality may be provided.

FIG. 7 shows MLB 700, comprising a generally planar circuit board containing the primary components of system 200 (FIG. 2) and associated support circuitry. In contrast to conventional generally rectangular MLBs, the T-shaped MLB 700 according to the present invention comprises first and second cutaway regions 702 and 704, forming a lower region 706 of MLB 700, with the region of MLB 700 located above cutaway regions 702 and 704 being designated generally as upper region 708. FIG. 7 illustrates exemplary respective component locations wherein CPU 102, PC card connector 710 for accommodating a PC Card 712 and backup battery 716 are located within upper region 708 and wherein main memory 104 is located in lower region 706.

Referring to FIG. 7, there is shown MLB 700 with CPU 102 being generally centrally located in upper region 708 and main memory 104 being located in lower region 706. In the embodiment shown, cutaway region 704 is shaped to provide accommodation of an internal battery or battery pack 714 and to provide an electrical connection between battery 714 and MLB 700. A backup battery 716 may optionally be placed on MLB, e.g., in upper region 708 as depicted in the embodiment shown. Battery 714 is most advantageously inserted through an opening in housing 202. A cover preferably provides a flush and sealing engagement with housing 202, and in one embodiment, the cover may be an integral portion of battery 714. Battery 714 may be any state of the art battery, preferably of the rechargeable type, such as nickel-cadmium, nickel-metal hydride, lithium ion, and the like.

Cutaway region 702 is shaped to provide accommodation of one or preferably two wireless receivers or transceivers. For example, the cutaway region 702 may contain both a wireless network transceiver, such as a wireless WAN or LAN card 718, and a GPS receiver 720. Network card 718 and GPS receiver 720 are shown as being adjacent to each other in cutaway region 702 in a coplanar arrangement. Hard disk drive 722 may be located directly beneath the network card 718 and GPS receiver 720.

Also depicted in FIG. 7 is cooling fan 724 that is mounted within housing 202 and that is located between MLB 700 and the top surface of computer 200. Fan 724 provides airflow through the interior of computer 200 by drawing in cooler outside air to prevent malfunction due to heat buildup, particularly in integrated circuits such as the CPU 102 or main memory 104. The CPU 102 and/or other components such as main memory 104 may optionally be thermally coupled to a cooling device such as a heat sink or heat tube or pipe to further aid in removing heat. In one embodiment, fan 724 is operable to draw air out of computer 200. Air will thus be drawn into the interior of computer 200 at some other vented location. In another embodiment, fan 724 is operable to force outside air into the interior of computer 200, wherein air will be forced out of the computer at some other vented location. Vents (not shown) may optionally be provided and positioned on housing 202 to create the desired path of air flow over the CPU and optionally other components. Alternatively, the vents may already be present, as in the form of disk drive slots, card slots such as PC-card slots, or other openings present on computer 200. Also depicted in FIG. 7 are the location of I/O panel 228 and antennae connectors 224 and 226 which are located on the top surface of computer 200.

Referring now to FIG. 8, there is shown an alternative embodiment of the T-shaped MLB according to the present invention. MLB 800 comprises a generally planar circuit board containing the primary components of the computer system and associated support circuitry, and is similar in shape to MLB 700 (FIG. 7), but which further comprises third cutaway region 802 in addition to first and second cutaway regions 702 and 704, while still retaining a general T-shaped configuration. MLB 800 thus comprises a lower region 706 and upper region 708. FIG. 8 illustrates exemplary respective component locations wherein CPU 102, PC card connector 710 for accommodating a PC Card 712, and fan 724 are located within upper region 708. Backup battery 716 and main memory 104 are located in lower region 706 of MLB 800.

CPU 102 is generally centrally located in upper region 708 and may be thermally coupled to a heat system 804. Heat system 804 may comprise a fan and optional internal air ducts to direct the flow of air, a cooling device such as a heat sink, heat tube, or the like. Cutaway region 704 is shaped to provide for accommodation of an internal battery or battery pack 714 and to provide an electrical connection between battery 714 and MLB 800. A backup battery 716 may optionally be placed on MLB, e.g., in lower region 706 as depicted in the embodiment of FIG. 8.

Cutaway region 702 is shaped to provide accommodation of one or preferably two wireless receivers or transceivers. For example, the cutaway region 702 may contain both a wireless network transceiver, such as a wireless WAN or LAN card 718, and a GPS receiver 720. Network card 718 GPS receiver 720 are shown as being adjacent to each other in cutaway region 702 in a coplanar arrangement. Hard disk drive 722 may be located directly beneath the network card 718 and GPS receiver 720.

Third cutaway region 802 is shaped to provided accommodation for I/O panel 228 and antennae connectors 224 and 226. Also depicted in FIG. 8 is cooling fan 724 located over MLB 800 in upper region 708.

Figure 9:
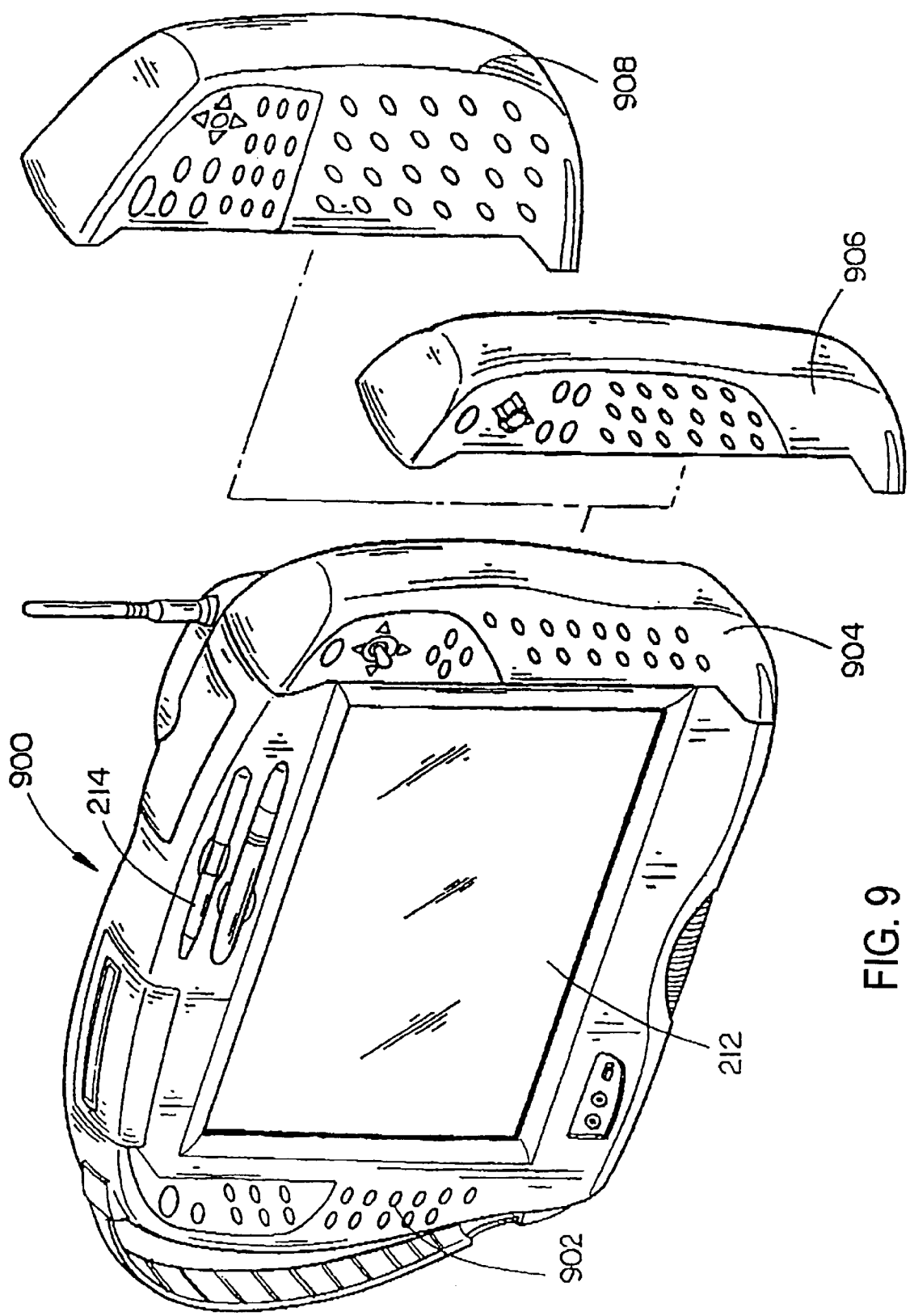
FIG. 9 depicts an exemplary computer according to the present invention employing removable and interchangeable keypad add on modules.

Referring now to FIG. 9, there is shown a computer 900 according to the present invention wherein one or more modular removable keyboards 902, 904, 906, and 908 may be provided to keypad based data entry. The hand-held computers in accordance with the present invention are particularly suited for pen-based input wherein the user interacts with the computer 900 using a writing instrument such as stylus 214 on touch screen 212 and thus, can be operated without the need for a keyboard. A keyboard, however, may be useful of even advantageous for data entry, depending on user preferences or the nature of the particular types of data entry tasks to be performed. Given the modular nature of the keyboards 902–908, it is desirable to provide a variety of interchangeable keyboards having different levels of functionality. For example, the functionality of the removable keyboard may range from a numerical keypad to an alphanumeric keypad. Specialized or programmable function keys may also be provided, for example, to perform application specific functions or to control a remote or attached data collection peripheral device such as an optical reader. Other levels of functionality that may optionally be present on a keyboard module include cursor control, such as arrow keys or an integrated pointing device such as touch pad or joystick type controllers, mouse button event switches, and so forth. Keyboards 902–908 may also provide additional functions, such as an additional RF transceiver, a cellular telephone device, and so forth.

Figure 10:
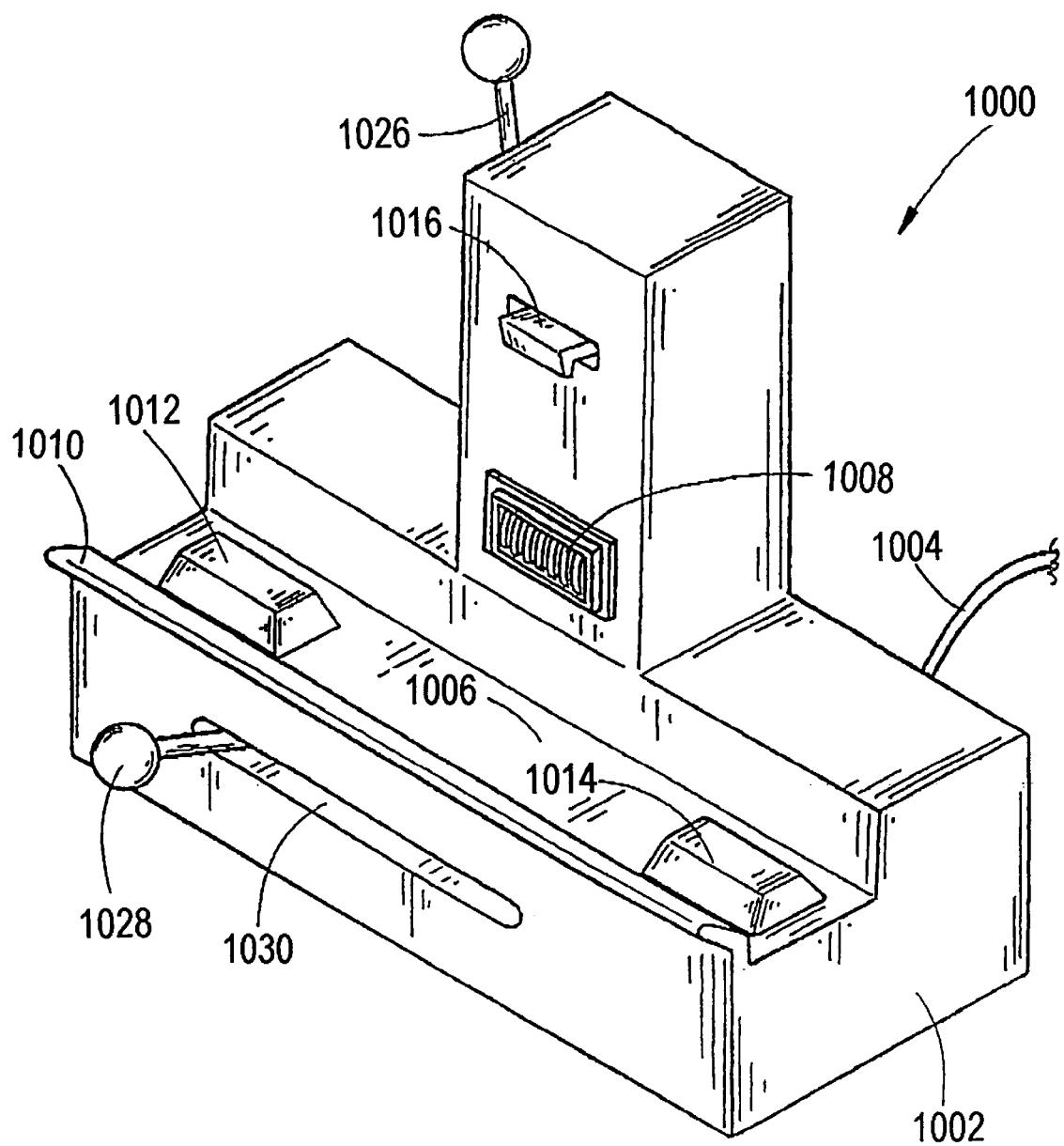
FIG. 10 depicts an exemplary docking apparatus according to the present invention.
Figure 11:
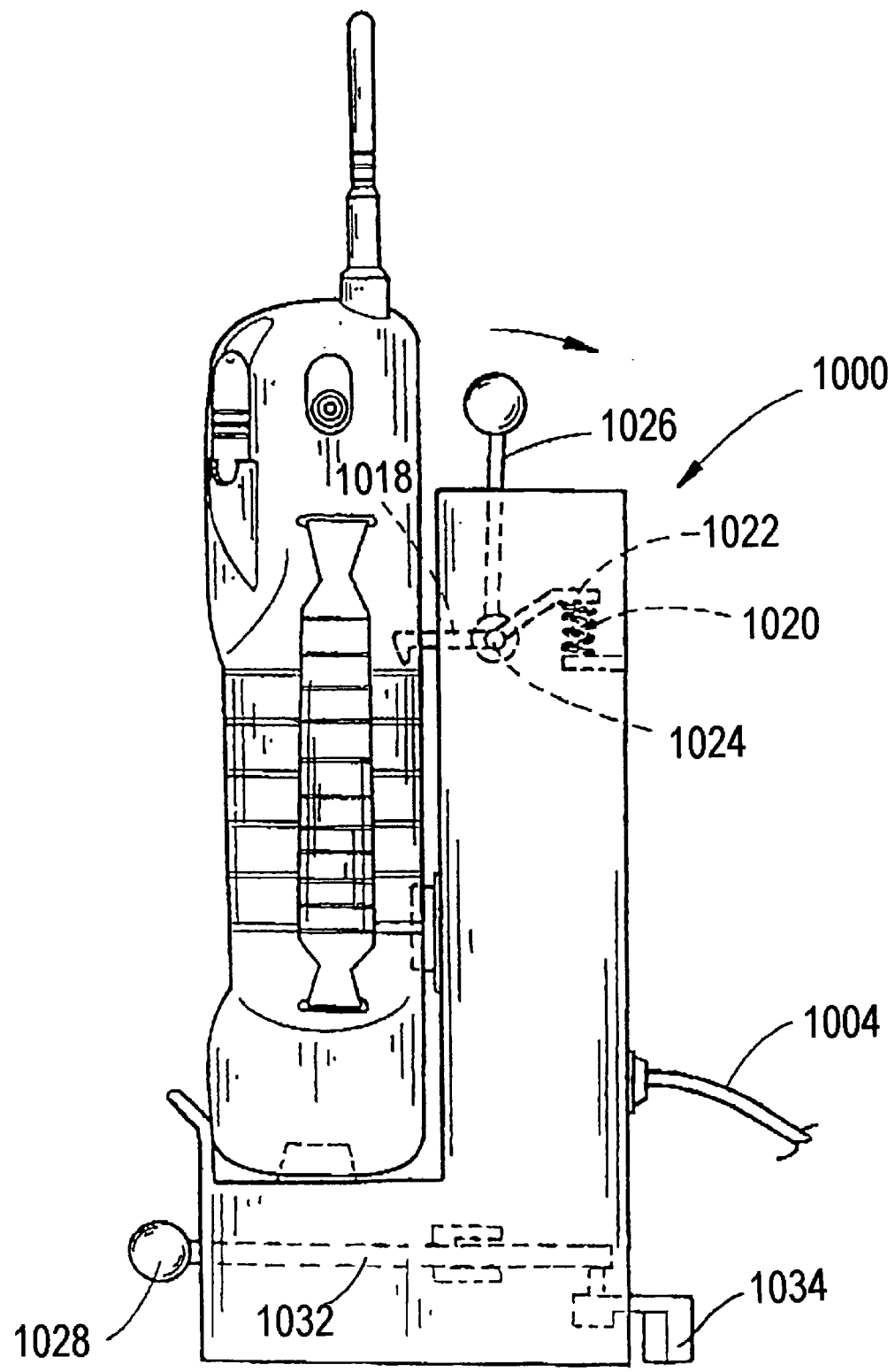
FIG. 11 depicts a side view of the docking unit depicted in FIG. 10.
Figure 12:
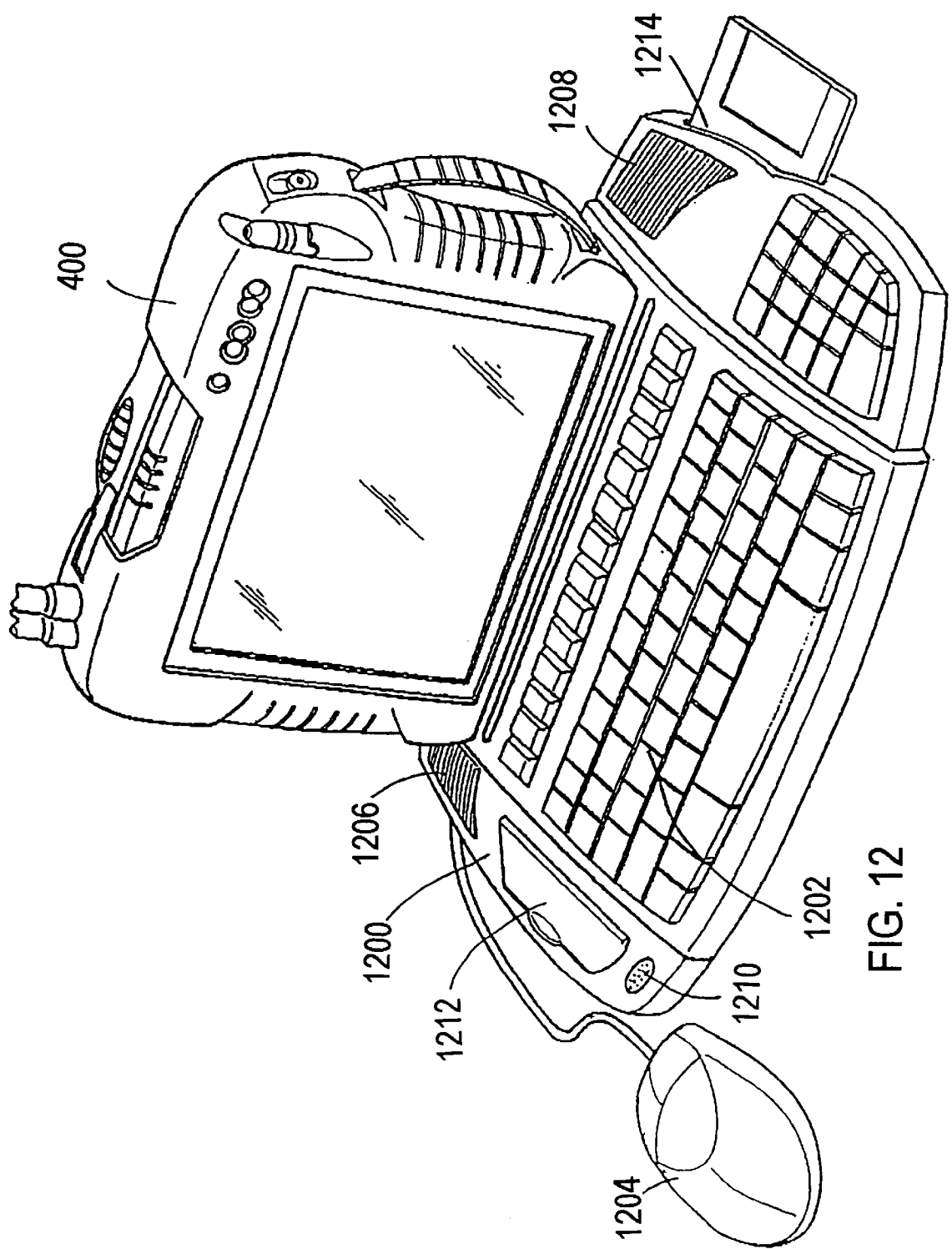
FIG. 12 depicts an alternative docking unit adapted to stationary, e.g., desktop, use.

FIGS. 10–12 depict exemplary docking apparatuses in accordance with the present invention. FIGS. 10 and 11 depict an exemplary computer docking unit 1000 according to the present invention of a type that may be adapted for stationary or vehicle use. Dock 1000 comprises a housing 1002. In one embodiment, dock 1000 may be adapted for stationary use and housing 1002 may be placed on a surface at a location that allows an operator to place the computer in the dock 1000, e.g., at the end of a shift or upon completion of a route, for battery recharging, data transfer, communication with peripheral devices such as a printer, external monitor, and so forth.

In another embodiment, dock 1000 may be adapted for vehicle use. A vehicle based dock is advantageous where a computer must operate for long periods of time, e.g., at remote sites. In this manner, a vehicle's electrical system may be employed to power the computer recharge the computer's internal batteries when the computer is docked. The vehicle dock may also provide for remote data communication with a central computer or system. Exemplary data communication means include, for example, wireless links such as RF, cellular telephone, and the like, whereby collected information may be transmitted prior to the end of an operator's shift or completion of a route. Dock 1000 may also provide communication with a portable printer to provide a hard copy such as an invoice or delivery ticket and so forth, communication with a fax and/or modem, etc., or may provide connection to a vehicle's high gain antenna. When vehicle use is desired, housing 1002 may be provided with mounting holes, a bracket, or the like, to allow the dock to be mounted on within the interior cabin of a vehicle such as a truck, delivery van, or the like. In a preferred embodiment, dock 1000 is adapted to be mounted to an adjustable pedestal attached to the floor or other surface of a vehicle so that the docked computer may be positioned to allow the vehicle operator to view and operate the computer.

An electrical connector 1004 is shown extending through housing 1002 to provide interconnection between the docked data collection terminal and an electrical power source, such as the AC power source of the building in which the docking unit is installed, or the electrical system of a vehicle. Data ports (not shown) may also be provided on housing 1002 for interconnection between the computer and peripheral devices such as a radio transceiver, computer, printer, modem, or the like (not shown).

A channel 1006, into which the computer according to the present invention may be removably inserted, is mounted within housing 1002. Preferably, the interior shape of the channel 1006 conforms to the exterior shape of a computer housing such that the computer is held securely within the dock 1000 and wherein a steady electrical connection is made between the electrical contacts 1008 of the dock 1000 and mating and correspondingly aligned electrical contacts 416 (see FIG. 4) of the computer when the computer is inserted into dock 1000. The front portion 1010 of channel 1006 should allow access by the user to the entire display of the computer.

Electrical contacts 1008 are disposed on a surface of housing 1002. These contacts 1008 may comprise surface contacts or the like that mate with complementing contacts 416 (FIG. 4) on the housing of portable computer in accordance with the present invention to provide electrical interconnection between the computer and dock 1000. The placement of the electrical contacts on dock 1000 is dictated by the placement of contacts on the computer that is to be docked therein. For example, in alternative embodiments of the invention (not shown), the electrical contacts 1008 may be located on the base of channel 1006 where the computer for which it is desired to provide docking functionality contains electrical contacts on the base of the unit. An optional indicator light (not shown) that may be, for example, an LED, may be located on housing 1002 to indicate when current is flowing between dock 1000 and the computer. The indicator light may be used, for example, to indicate when the computer battery is being charged, when the computer is being operated by the external electrical system, when data transfer is taking place, etc.

Protrusions 1012 and 1014 that engage complimentary depressions on the surface of the computer to be docked may be provided to ensure proper alignment of the computer within dock 1000. By assuring proper alignment, potential damage to the computer can be avoided and a secure electrical and/or communication coupling can be provided. Other examples of means for initially retaining and aligning the computer include, for example, grooves or channels in the terminal cup corresponding to external features of a data collection terminal (e.g., to provide a keyed fit between the computer and the terminal cup), guide rollers, resilient protrusions that engage a complementary depression or indentation on a computer housing, etc.

To dock the portable data collection terminal in dock 1000, the computer is aligned within channel 1006, using protrusions 1012 and 1014 as a guide. When the proper alignment is achieved, a retention means is operable to retain the computer within the dock. In the embodiment depicted, the retention means is provided by a moveable latch 1016 which is aligned with a complimentary cavity or notch 418 (see FIG. 5) in the housing of the computer that may receive and engage latch 1016. In the embodiment depicted, latch 1016 is attached to a pivoting arm 1018. Latch is urged downward by spring 1020 and lever 1022. Lever 1022 and arm 1018 are attached to a rotating axle 1024 mounted within housing 1002. The front face of lever 1016 is angled so as to be urged upwardly against the urging of spring 1020 in response to pressure exerted thereon by the edge of cavity 418 when the computer is being docked. When the computer is properly positioned in the dock, the latch 1016, having been urged upward and received within notch 418 may then be urged downward by spring 1020 to provide secure retention of the computer. A handle 1026 attached to axle 1024 is provided for releasing the computer. By moving the handle, axle 1024 may be turned to raise latch 1016 against the urging of spring 1020, allowing the unit to be removed from the dock.

In alternative embodiments (not shown), the retention means may be provided by complementary latches, clips, and the like, attached or otherwise formed on the respective surfaces of the computer and dock housing 1002, wherein dimension tolerancing provides a secure, snap-like connection. In other embodiments (not shown), the retention means may include, for example, grooves or channels on housing 1002, resilient protrusions, and the like, that conform to the exterior shape or exterior features of the computer, and the particular configuration utilized will depend on the particular computer to be utilized with the dock 1000.

Also shown in FIGS. 10 and 11 is an exemplary mechanism for affixing dock 1000. Handle 1028 operates lever 1032 which moves within slot 1032 in housing 1002. Level 1032 is operable to release and engage clamping member 1034. In this manner, dock 1000 may be readily affixed to a mounting surface (not shown), such as a vertically mounted plate at the desired docking location such as in a building or on a floor mounted pedestal in a vehicle. In a preferred embodiment, an over-center mechanism is provided, for example, by employing a suitably shaped rotating cam and/or spring, such that movement of the handle less than the full distance of slot 1030 will cause a self-return of clamping member 1034 to either the open or locked position.

Referring now to FIG. 12, there is shown a computer docking unit 1200 particularly suited to stationary use. Dock 1200 provides functionality similar to the docking unit 1000 depicted in FIGS. 10 and 11 and as described in reference thereto. Dock 1200 further provides the network and peripheral connectivity of a desktop computer in a relatively small footprint device.

Dock 1200 receives the computer, such as computer 400, to provide an electrical connection and data communication connection thereto in a manner similar to that described above in reference to FIGS. 10 and 11. In a preferred embodiment, the dock 1200 allows pivoting of the computer 400 to provide a user adjustable viewing angle.

An integral alphanumeric keyboard 1202 is provided. Keyboard 1202 is preferably a state of the art keyboard such as a Windows®95 compatible keyboard or the like. In an embodiment not shown, a pointing device such as a touch pad or the like may be integrated into the dock, e.g., in the region of keyboard 1202.

Dock 1200 accommodates standard peripherals such as mouse 1204 or other pointing devices, and preferably contains ports for network connections, printers, modems, external monitors, or other peripheral devices as described herein. Some or all of the ports may be located in concealed enclosures, such as enclosure 1212, and the connectors may be standardized quick-connect and quick-disconnect types so that devices may readily be interchanged and placed at desired locations.

In one embodiment, the dock 1200 provides integral speakers 1206 and 1208 and microphone 1210 and a removable media drive 1214. In a particularly preferred embodiment, the removable media drive 1214 itself is removable and interchangeable so that various types of removable media may be accommodated.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

SUMMARY OF THE HARD DRIVE SHOCK MOUNT FEATURE IN ACCORDANCE WITH THE PRESENT INVENTION

The present invention may provide ruggedization features to any portable electronic device that utilizes a hard drive. Ruggedization of electronic devices is highly advantageous for many uses of electronic devices in today's society. Moreover, as technology continues to progress, the use of electronic devices will likely infiltrate more and more aspects of everyday human life. Thus, for both existing applications of portable electronic devices and future applications, ruggedization is a paramount concern.

The present invention may provide for a shock resistant portable computer. In particular the present invention may relate to portable computers that house a hard drive. Hard drives are well known in the art to provide reliable, non-volatile storage of electronic data. However, like some other electronic devices, hard drives may be susceptible to damage if exposed to an electrostatic discharge. Grounding the hard drive may avoid the problems related to electrostatic discharge and thereby prevent the hard drive from exposure to damage related to electrostatic discharge. In this light, it should be understood that the present ruggedization invention, although focused towards a hard drive, may have applications with any other electronic component of a portable computer that requires grounding to avoid problems associated with electrostatic discharge.

In one embodiment, the present invention may provide a shock resistant portable computer. The portable computer may comprise a housing. The housing may be formed with an aperture so that a display screen may be viewed through the housing. Moreover, the housing may be formed to provide access to any assortment of buttons, keys, ports, PCMCIA card slots, antennas, power supplies or the like. Preferably, the housing may provide a hermetic seal to protect the internal electronic components from external contaminants (such as water or the like) which may adversely affect the operation of the device.

The portable computer may further comprise electronic components housed within the housing. These electronic components may include, but are not limited to, the different electronic components illustrated in FIGS. 7 and 8. As shown in FIGS. 7 and 8, at least one of the electronic components may be a hard drive. In accordance with the present invention, the hard drive may be shock mounted to protect the hard drive from damage due to physical shock to the portable computer (e.g. in the event that the device is dropped or otherwise mishandled).

To achieve ruggedization the present invention may comprise a hard drive shock mount. The shock mount may include a shock absorbing sleeve formed to hold the hard drive and may further include an electrically conductive material that connects the hard drive to an electric ground. The electrically conductive material may engage or otherwise contact the hard drive at a first contact point when the hard drive is held in the shock absorbing sleeve. A second contact point of the electrically conductive material may be connected to an electric ground. In the preferred embodiment, the second contact point may be connected to a metal frame housed within the housing.

The shock resistant sleeve may be formed from any shock absorbing material. By way of example and not limitation, one or more of the following materials may be used to form the shock resistant sleeve: urethane, visco-elastic material, foam, rubber, an elastomeric substance, a thermoplastic substance, plastic or a gel-type material. Other materials could also be used. In one embodiment, the shock resistant sleeve may be formed from a foam sold under the trade name Poron™. Appendix A, attached hereto, provides specifications on materials that may be used to construct a shock resistant sleeve in accordance with the present invention. In one embodiment, the sleeve may formed from urethane such as those described at pages 4–6 of appendix A. A pressure sensitive adhesive such as that described at page 2 of appendix A may be used to adhere the urethane in realization of a shock resistant sleeve. Appendix A (pages 1–8) is hereby incorporated herein by reference in its entirety.

The electrically conductive material could be any type of electrically conductive material including a copper wire or the like. However, in the preferred embodiment the electrically conductive material is an electrically conductive fiber. The fiber may be an adhesive fiber and it may be adhesively connected to the shock absorbing sleeve. Moreover, the fiber may be adhered to an adhesive tape such that the adhesive tape in turn adheres the fiber to the electric ground. In the preferred embodiment, the electrically conductive material is a non woven nickel/copper polyester as described on page 3 of appendix A.

In an additional embodiment, the present invention may provide a shock resistant hard drive. The shock resistant hard drive may comprise a hard drive and a shock resistant sleeve substantially encapsulating the hard drive. In addition the shock resistant hard drive may comprise an electrically conductive material having a first contact point and a second contact point, the first contact point being in physical contact with the hard drive and the second contact point being connected to an electric ground.

In accordance with this embodiment, the shock resistant sleeve may be formed from urethane, visco-elastic material, foam, rubber, an elastomeric substance, a thermoplastic substance, plastic or a gel-type material. However, other materials could also be used. In one embodiment, the shock resistant sleeve may be formed from a foam sold under the trade name Poron™.

The electrically conductive material could be any type of electrically conductive material such as a copper wire or the like. Again, however, in the preferred embodiment the electrically conductive material may be an electrically conductive fiber such as a non woven nickel/copper polyester. The fiber may be an adhesive fiber and it may be adhesively connected to the shock absorbing sleeve. Moreover, the fiber may be adhered to an adhesive tape such that the adhesive tape in turn adheres the fiber to the electric ground. In one embodiment, an acrylic pressure sensitive adhesive, as described at page 7 of appendix A, may be used to adhere the fiber to the electric ground.

In still another embodiment, the present invention may provide a method of mounting a hard drive within an electronic device. The electronic device may be any electronic device that has a hard drive and requires ruggedization. The method may comprise mounting the hard drive in a shock resistant sleeve and connecting the hard drive to ground.

In accordance with the method, the shock resistant sleeve may be formed from the materials described above. In addition, the hard drive may be connected to ground in the manner described above (e.g. using a conductive fiber or the like).

DETAILED DESCRIPTION OF THE HARD DRIVE SHOCK MOUNT FEATURE IN ACCORDANCE WITH THE PRESENT INVENTION

Figure 13:
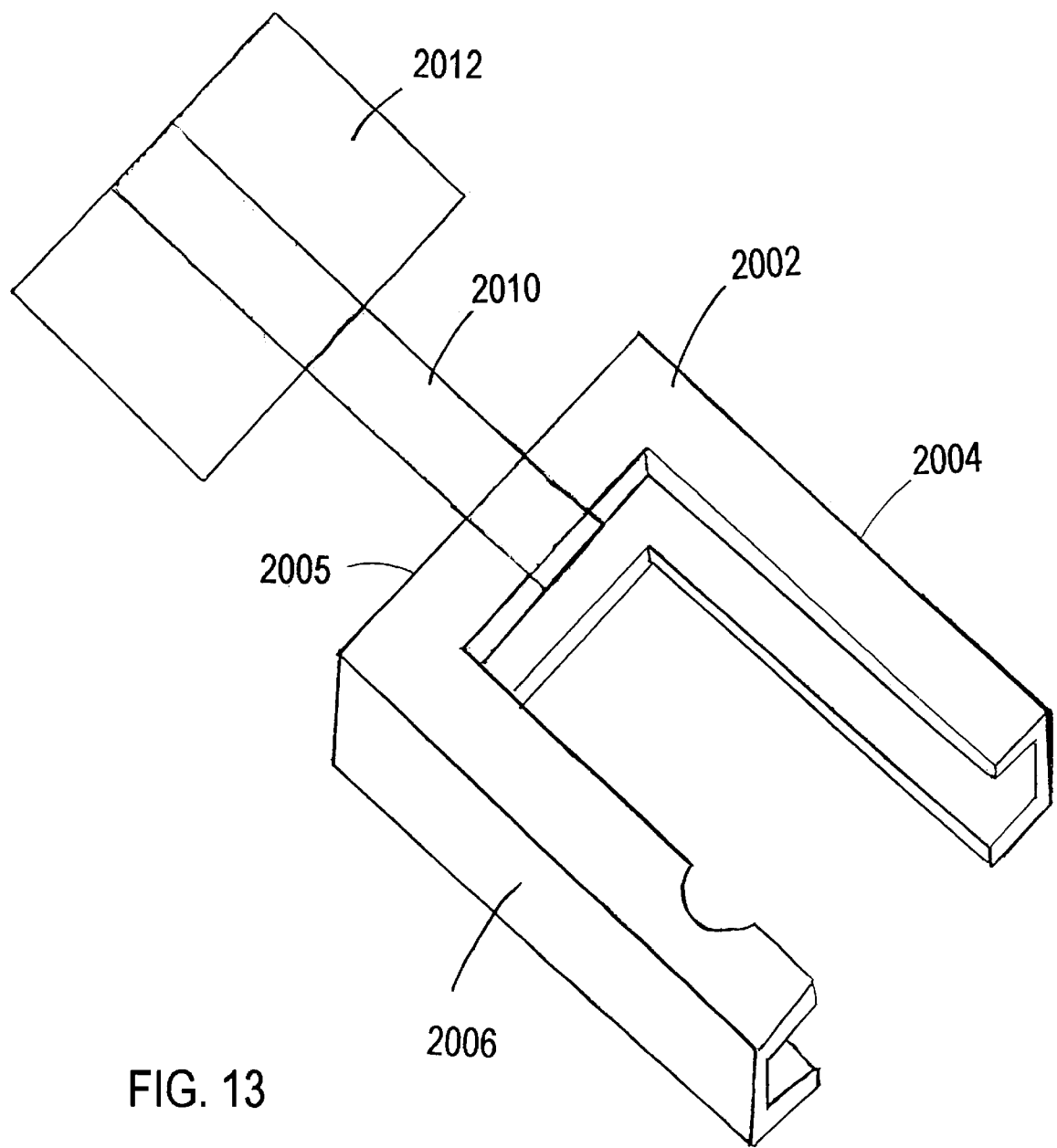
FIG. 13 depicts an apparatus for shock mounting a hard drive within a portable computer.

Referring now to FIG. 13, depicted is the preferred embodiment of a hard drive shock mount in accordance with the present invention. A shock absorbing sleeve 2002 may be formed out of a shock absorbing material. The shock absorbing sleeve 2002 may be formed to receive a hard drive. A first end of a hard drive (see 2020 FIG. 15) may be electrically connected to a portable computer. As such, when mounting the hard drive into the shock absorbing sleeve 2002, the second end of the hard drive (i.e. the non-electrically connected end) may slide into the shock absorbing sleeve such that the three sides (2004, 2005 and 2006) of the shock absorbing sleeve 2002 physically encapsulate the three non-electrically connected sides of the hard drive.

An electrically conductive material 2010 may be integrated into or connected to the shock absorbing sleeve 2002. In the preferred embodiment, the electrically conductive material 2010 may be an electrically conductive fiber that is adhesively connected to the shock absorbing sleeve 2002. When the hard drive is inserted into the shock absorbing sleeve 2002, the electrically conductive material 2010 physically engages the hard drive. By connecting the electrically conductive material 2010 to an electric ground, the hard drive may be grounded while it resides in the shock absorbing sleeve 2002. In the preferred embodiment, the electrically conductive material 2010 is a conductive fiber connected to ground via an adhesive tape 2012. The adhesive tape 2012 may be formed out of the same material as the shock absorbing sleeve 2002. The shock absorbing sleeve 2002 may have additional features such as a cut out portion 2014 to provide air hole clearance for the hard drive.

Figure 14:
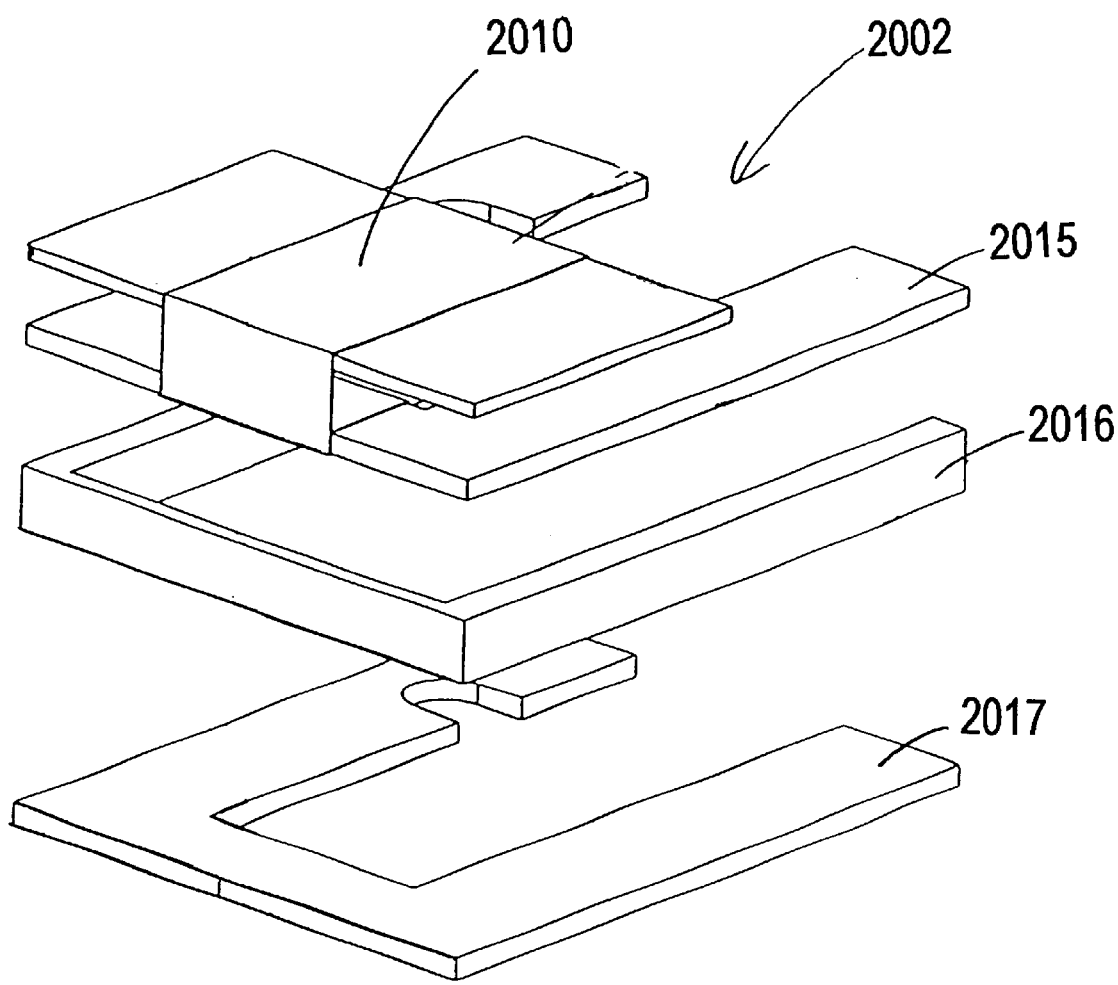
FIG. 14 is an exploded view of the apparatus in FIG. 13.

FIG. 14 is an exploded view of an exemplary embodiment of a hard drive shock mount in accordance with the present invention. As shown in FIG. 14, the shock absorbing sleeve 2002 may be described as having a top portion 2015 a middle portion 2016 and a bottom portion 2017. These three portions (2015–2017 may be adhered to one another using a pressure sensitive adhesive such as that described in page 2 of Appendix A. In constructing an apparatus for shock mounting a hard drive, the electrically conductive material 2010 may be adhered around any of these three portions. As shown in FIG. 14, the electrically conductive material 2010 may be adhered to the top portion 2015 of the shock absorbing sleeve 2002.

In accordance with one embodiment, the present invention may provide a shock resistant hard drive. The shock resistant hard drive may comprise a hard drive (see 2020 FIGS. 16 and 17). In addition, a rigid casing 2022 may encase the hard drive. A shock resistant sleeve 2002 may substantially encapsulate the hard drive. In addition, the shock resistant hard drive may comprise an electrically conductive material 2010 having a first contact point and a second contact point, the first contact point being in physical contact with the hard drive and the second contact point being connected to an electric ground.

In accordance with this embodiment, the shock resistant sleeve 2002 may be formed from urethane, visco-elastic material, foam, rubber, an elastomeric substance, a thermoplastic substance, plastic or a gel-type material. However, other materials could also be used. In one embodiment, the shock resistant sleeve 2002 may be formed from a foam sold under the trade name Poron™. Pages 4–6 of Appendix describe different urethane materials that may be used to realize a shock resistant sleeve 2002.

The electrically conductive material 2010 may be an electrically conductive fiber. The fiber may be an adhesive fiber and it may be adhesively connected to the shock absorbing sleeve 2002. Moreover, the fiber may be adhered to an adhesive tape 2012 such that the adhesive tape 2012 in turn adheres the fiber to the electric ground. In one embodiment, the electrically conductive fiber may be realized using a non woven nickel/copper polyester such as that described on page 3 of Appendix A.

Figure 15:
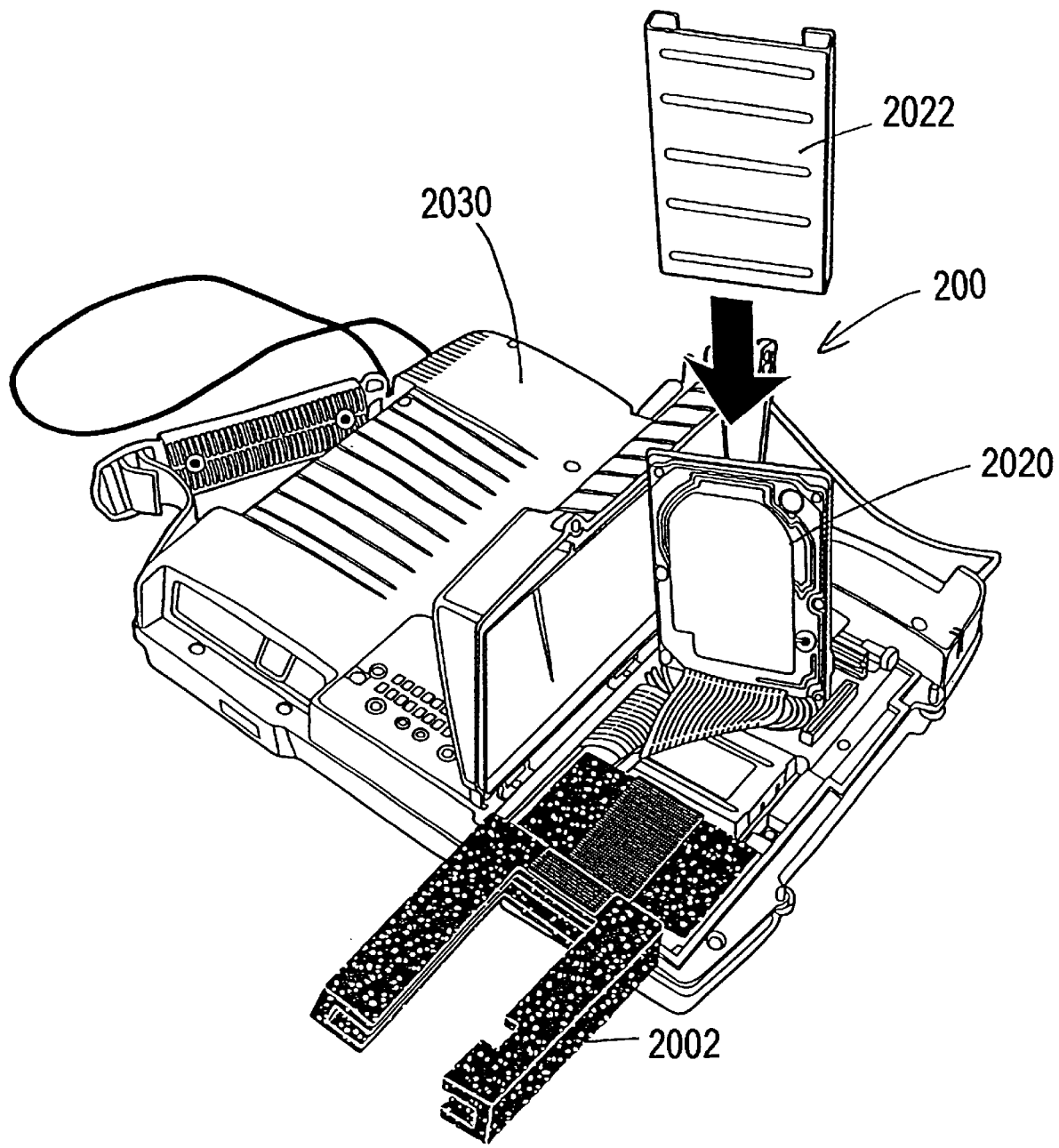
FIG. 15 depicts a portable computer implementing a hard drive shock mount in accordance with the present invention.
Figure 16:
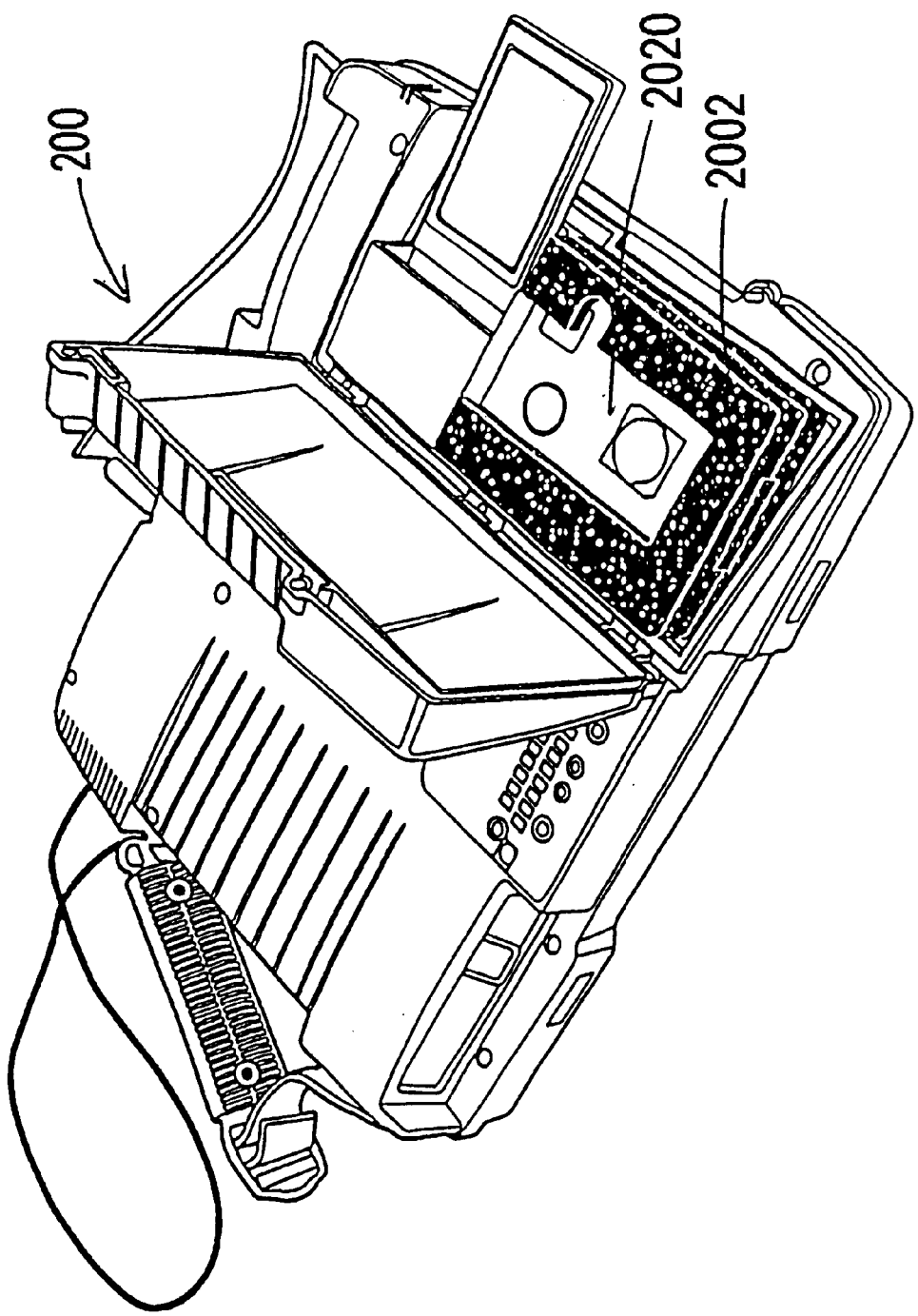
FIG. 16 depicts the portable computer of FIG. 15 having a hard drive inserted into a hard drive shock mount in accordance with the present invention.

FIG. 15 shows a portable computer 200 in accordance with the present invention. The computer 200 may have a hard drive 2020 that is electrically connected to the computer 200. The hard drive may be encased within a rigid casing 2022. FIG. 16 illustrates computer 200 wherein a hard drive 2020 has been inserted into a hard drive shock mount 2002.

Portable computer 200 illustrates one embodiment of shock resistant portable computer in accordance with the present invention. The portable computer 200 may comprise a housing (2030 FIG. 15). The housing 2030 may be formed with an aperture so that a display screen may be viewed through the housing. Moreover, the housing 2030 may be formed to provide access to any assortment of buttons, keys, ports, PCMCIA card slots, antennas, power supplies or the like. Preferably, the housing 2030 may provide a hermetic seal to protect the internal electronic components from external contaminants (such as water or the like) which may adversely affect the operation of the device.

The portable computer 200 may further comprise electronic components housed within the housing. These electronic components may include, but are not limited to, the different electronic components illustrated in FIGS. 7 and 8. As illustrated in FIGS. 15 and 16, at least one of the electronic components may be a hard drive 2020. In accordance with the present invention, the hard drive may be shock mounted in a shock absorbing sleeve 2002 to protect the hard drive from damage due to physical shock to the portable computer (e.g. in the event that the device is dropped or otherwise mishandled).

The following numbered paragraphs (1–16) illustrate some exemplary features of the present invention:

1. A shock resistant portable computer comprising:
   a housing
   electronic components housed within the housing, wherein at least one of the electronic components is a hard drive, and
   a hard drive shock mount protecting the hard drive from shock, the hard drive shock mount including;
   shock absorbing sleeve formed to hold a hard drive, and
   an electrically conductive material having a first contact point and a
   second contact point, the first contact point being in physical contact with the hard drive when the hard drive is held in the sleeve and the second contact point being connected to an electric ground.
2. A shock resistant portable computer as described in paragraph 1, wherein the shock resistant sleeve is formed from a material selected from the following group of materials: urethane, visco-elastic material, foam, rubber, an elastomeric substance, a thermoplastic substance, plastic and a gel-type material.
3. A shock resistant portable computer as described in paragraph 1 or 2, wherein the electrically conductive material is a conductive fiber.
4. A shock resistant portable computer as described in paragraph 3 wherein the conductive fiber is a conductive fiber adhesive.
5. A shock resistant portable computer as described in paragraph 3 where the conductive fiber is adhesively connected to the shock absorbing sleeve.
6. A shock resistant portable computer as described in paragraph 1 wherein the second contact point is connected to a metal frame housed within the housing.
7. A shock resistant portable computer as described in paragraph 1 further comprising an adhesive tape adhering the second contact point of the electrically conductive material to the electric ground.
8. A shock resistant hard drive comprising:
   a hard drive,
   a shock resistant sleeve substantially encapsulating the hard drive, and
   an electrically conductive material having a first contact point and a second contact point, the first contact point being in physical contact with the hard drive and the second contact point being connected to an electric ground.
9. A shock resistant hard drive as described in paragraph 8, wherein the shock resistant sleeve is formed from a material selected from the following group of materials: urethane, visco-elastic material, foam, rubber, an elastomeric substance, a thermoplastic substance, plastic and a gel-type material.
10. A shock resistant hard drive as described in paragraph 8 or 9, wherein the electrically conductive material is a conductive fiber.
11. A shock resistant hard drive as described in paragraph 10 wherein the conductive fiber is a conductive fiber adhesive.
12. A shock resistant hard drive as described in paragraph 10 where the conductive fiber is adhesively connected to the shock absorbing sleeve.
13. A shock resistant hard drive as described in paragraph 9 wherein the second contact point is connected to a metal frame housed within the housing.
14. A shock resistant hard drive as described in paragraph 9 further comprising an adhesive tape adhering the second contact point of the electrically conductive material to the electric ground.
15. A method of mounting a hard drive within an electronic device comprising:
    mounting the hard drive in a shock resistant sleeve, and
    connecting the hard drive to an electronic ground.
16. A method of mounting a hard drive within an electronic device as described in paragraph 15, wherein the hard drive is connected to an electronic ground via a conductive fiber.

SUMMARY OF THE HERMETICALLY SEALED HEAT SINK WITH COOLING TUNNEL FEATURE IN ACCORDANCE WITH THE PRESENT INVENTION

The present invention may provide an improved method of cooling internal components of a portable computer. A heat sink may be used to conduct heat away from the internal components of the portable computer. The heat sink may be made of metal, and may be hermetically sealed to the housing of the portable computer. As such, a barrier between the internal components of the computer and the environment may be provided while still allowing effective thermodynamic transfer of heat away from the computer. A gasket may be used to seal the heat sink to the housing. In this manner, environmental contaminants (such as water) may not penetrate into the portable computer.

Computers and more specifically portable computers are well known in the art. Such computers are used to perform a multitude of different functions and tasks. As the electronics of computers has continued to evolve over the years, computers have continued to become faster, smaller, lighter, more portable, more reliable, and overall, better suited to improve the human experience. Improvements to portable computers will likely continue far into the future.

Thermodynamics may pose a number of potential problems to computers. When a computer is in operation, it will inevitably generate heat. This heat may in turn compromise the ability of the computer to operate most effectively. In addition, heat generated by a computer may irritate a user (e.g. in the event a hand held computer becomes hot, it may become uncomfortable to handle).

Heat sinks are known in the art, and are used to draw heat away from electronic components of a computer. They may come in an infinite number of shapes and sizes and may be used in multitudes of operations involving heat transfer. In one typical application a heat sink may physically engage an electronic component of a computer (such as a microprocessor) and draw heat away from that component.

As described above, the ruggedization of portable computers is a paramount concern. This ruggedization may include sealing and protecting a computer from the external environmental contaminates (such as water or dust or the like). However, in some applications sealing a portable computer may frustrate the ability to effectively transfer heat away from electronic components. For instance, in some applications, a housing or seal may limit the ability to cool internal components. In other applications, although heat may be transferred through the housing or seal, that heat may irritate an end user (e.g. when the device becomes hot it may become uncomfortable to hold).

The present invention may provide improved methods and apparatuses for cooling internal components of a portable computer. More specifically, the invention may provide improved methods and apparatuses for cooling the components of a ruggedized portable computer that may be used in a rugged environment.

The present invention may provide a portable computer. The portable computer may comprise a housing and electronic components may be housed within the housing. A heat sink may be hermetically sealed to the housing and may be thermally engaged to at least one of the electronic components. The housing may be formed with a cooling tunnel and the heat sink may be located inside the cooling tunnel. The cooling tunnel may have a first end and a second end. An air intake hole may be formed on the housing and defining the first end of the cooling tunnel. Moreover, an air exhaust may be formed on the housing and defining the second end of the cooling tunnel.

The portable computer in accordance with the present invention may further comprise a fan. The fan may reside inside the cooling tunnel and may be located adjacent to the air exhaust. The fan may draw air in the air intake and blow air out of the air exhaust. In this manner, the heat drawn away from the portable computer may be channeled away from the computer so that the computer may remain cool in the hands of an end user.

The heat sink may take an infinite number of form factors. By adding grooves, channels, ruts, divots, ridges, crests, or any other surface aberration, the surface area of the heat sink may be increased so that heat may be transferred more effectively. In the preferred embodiment, the heat sink is formed with ridges. A gasket may be located between the heat sink and the housing to provide an adequate hermetic seal from the environment.

In another embodiment, the current invention may comprise a method of drawing heat away from a ruggedized electronic device. The ruggedized electronic device may comprise a housing formed with a cooling tunnel and electronic components housed within the housing. A heat sink may be hermetically sealed to the housing and located inside the tunnel. The method may comprise drawing air into the cooling tunnel so that the air passes over the hermetically sealed heat sink and exhausting air out of the cooling tunnel. A single fan may both draw the air into the tunnel and exhaust air out of the tunnel. The fan may be located inside the cooling tunnel.

In an additional embodiment the present invention may comprise an article of manufacture. The article of manufacture may be a computer and may be a portable ruggedized computer. The article of manufacture may comprise a housing and electronic component housed within the housing. The article of manufacture may further comprise a means for drawing heat away from at least one of the electronic components and protecting the electronic components from environmental contamination. The means for drawing heat away from the electronic components may be a heat sink hermetically sealed to the housing.

The article of manufacture may further comprise a tunnel means formed in the housing. Moreover, the means for drawing heat away from at least one of the electronic components may reside inside the tunnel means. The tunnel means may be a tunnel formed in the housing of the article. The article of manufacture may still further comprise a fan means for drawing air through the tunnel means.

DETAILED DESCRIPTION OF THE HERMETICALLY SEALED HEAT SINK WITH COOLING TUNNEL FEATURE IN ACCORDANCE WITH THE PRESENT INVENTION

Figure 17:
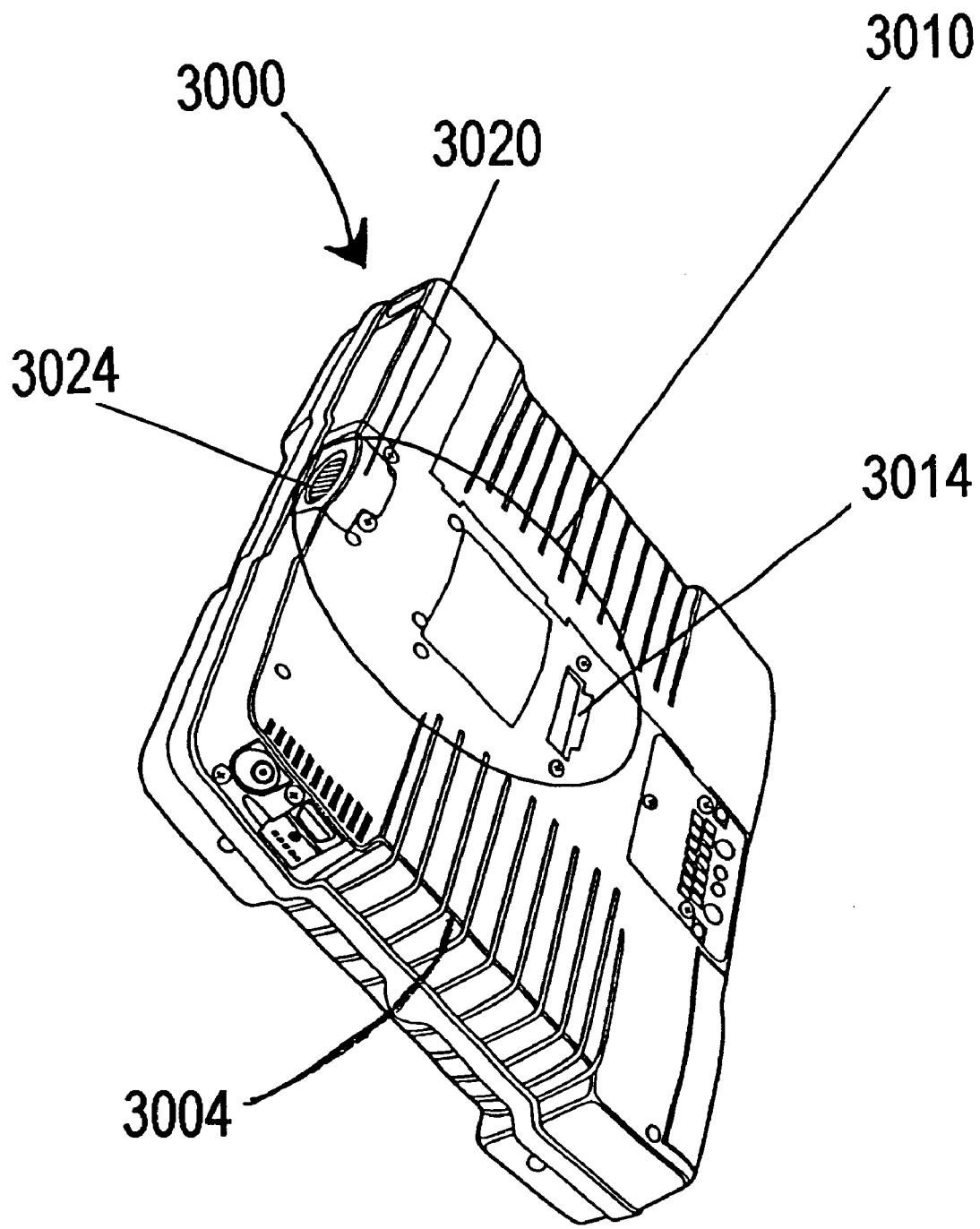
FIGS. 17–18 depict an improved method of cooling internal components of a rugged portable computer.
Figure 18:
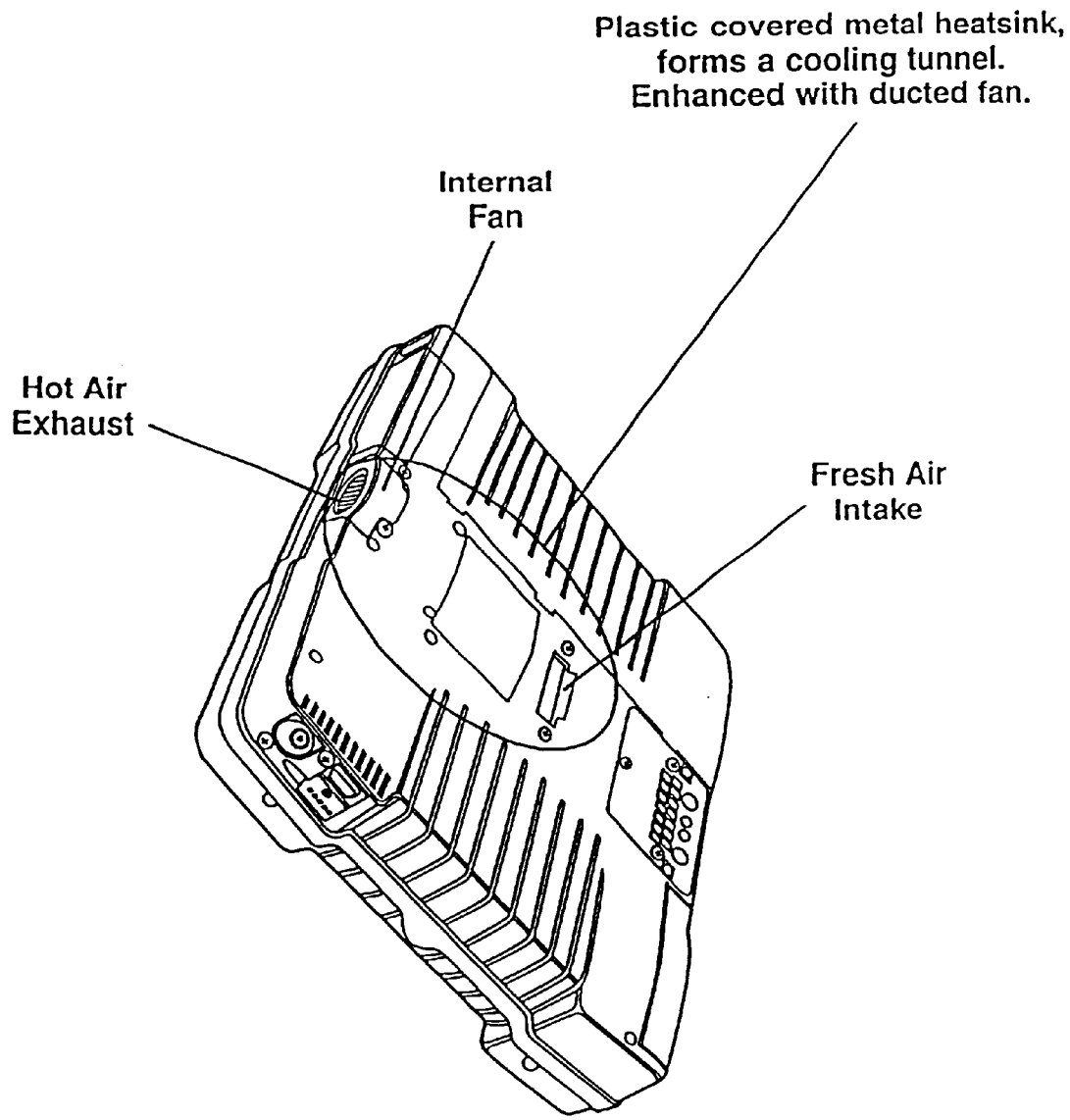

Referring now to FIGS. 17 and 18, illustrated is the preferred embodiment of a hermetically sealed heat sink with a cooling tunnel. The present invention may provide a portable computer 3000. The computer 3000 may comprise a housing 3004. Moreover, the housing 3004 of the portable computer 3000 may be formed to cover a heat sink (not shown in FIGS. 17–18, see FIGS. 19–21). In this manner a cooling tunnel 3010 may be formed. Air from the environment may enter the cooling tunnel 3010 via an air intake hole 3014 formed on the housing of the portable computer 3000. A fan 3020 may draw air in the air intake hole 3014 to pass through the cooling tunnel 3010. The air may draw heat away from the hermetically sealed heat sink (not shown) in accordance with principles of thermodynamics. The air may then be blown out of the cooling tunnel 3010 through an air exhaust 3024 so that the heated air rejoins the external environment. In this manner heat may be effectively drawn away from the external components of the portable computer 3000 while the internal components (such as electric circuitry and the like) are protected from the hostile environment.

Hermetically sealing the heat sink to the portable computer 3000 insures that no external contaminants (such as water or the like) are able to permeate the portable computer 3000 in the event that such contaminants enter the cooling tunnel. Moreover, by providing a cooling tunnel 3010 and a fan 3020, heat is drawn away from the heat sink and away from the housing. In this manner, a user holding the portable computer may not feel the heat from the heat sink when holding the computer. In the typical operational setting, a user may hold the portable computer with his or her hand on the back of the housing 3004. As such, the cooling tunnel 3010 may insure that the heat does not irritate the user.

The cooling tunnel 3010 is preferably formed as a tunnel through the housing of the portable computer 3000. The metal heat sink is preferably housed within the tunnel 3010 and hermetically sealed to the portable computer 3000 within the tunnel 3010. In this manner, the metal heat sink may form part of the housing that houses the internal components of the portable computer 3000. At the same time, however, the heat sink may be visibly sealed from a user inside the tunnel 3010.

Figure 19:
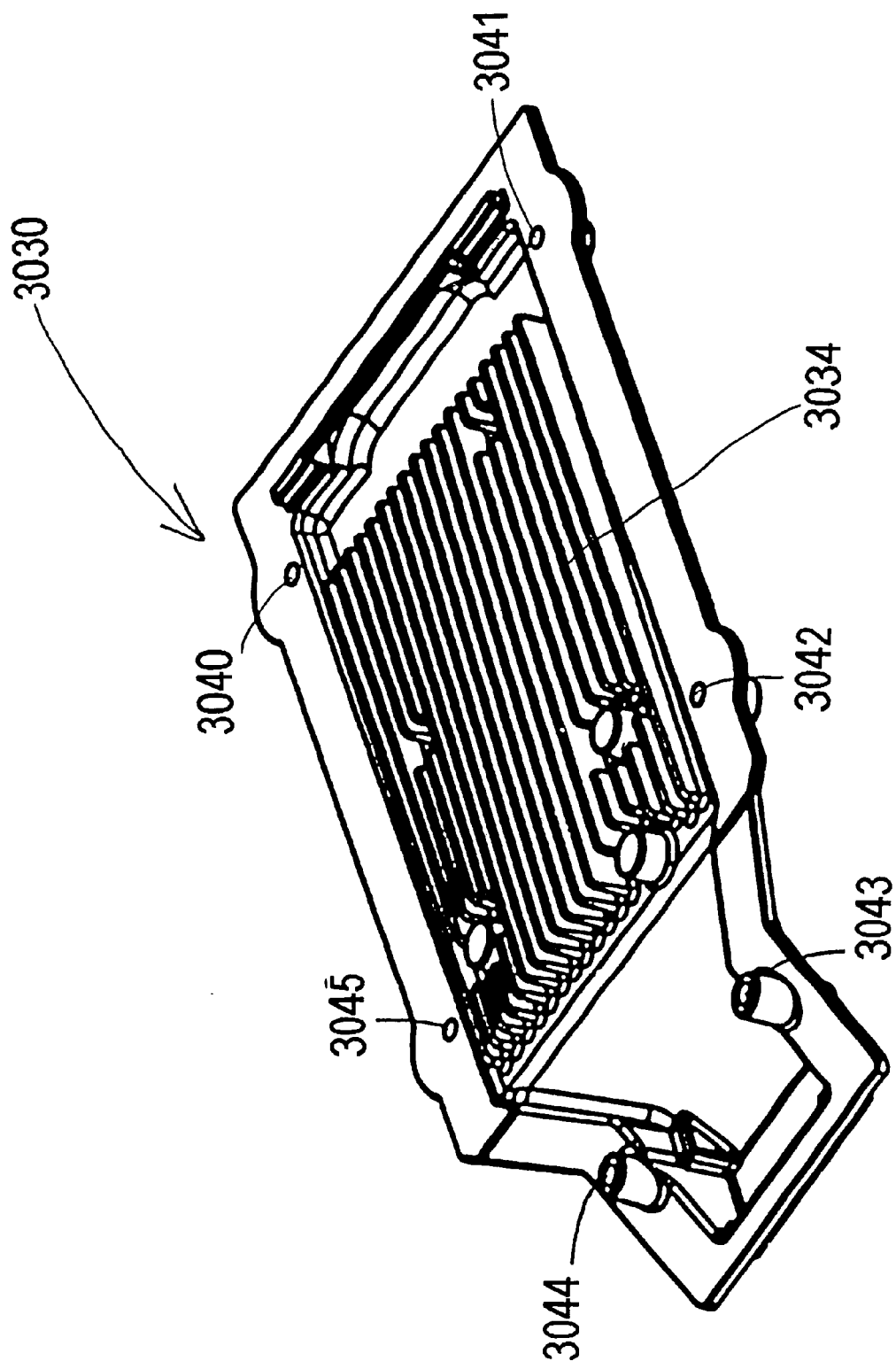
FIGS. 19–21 depict a heat sink that may be used in accordance with the present invention.
Figure 20:
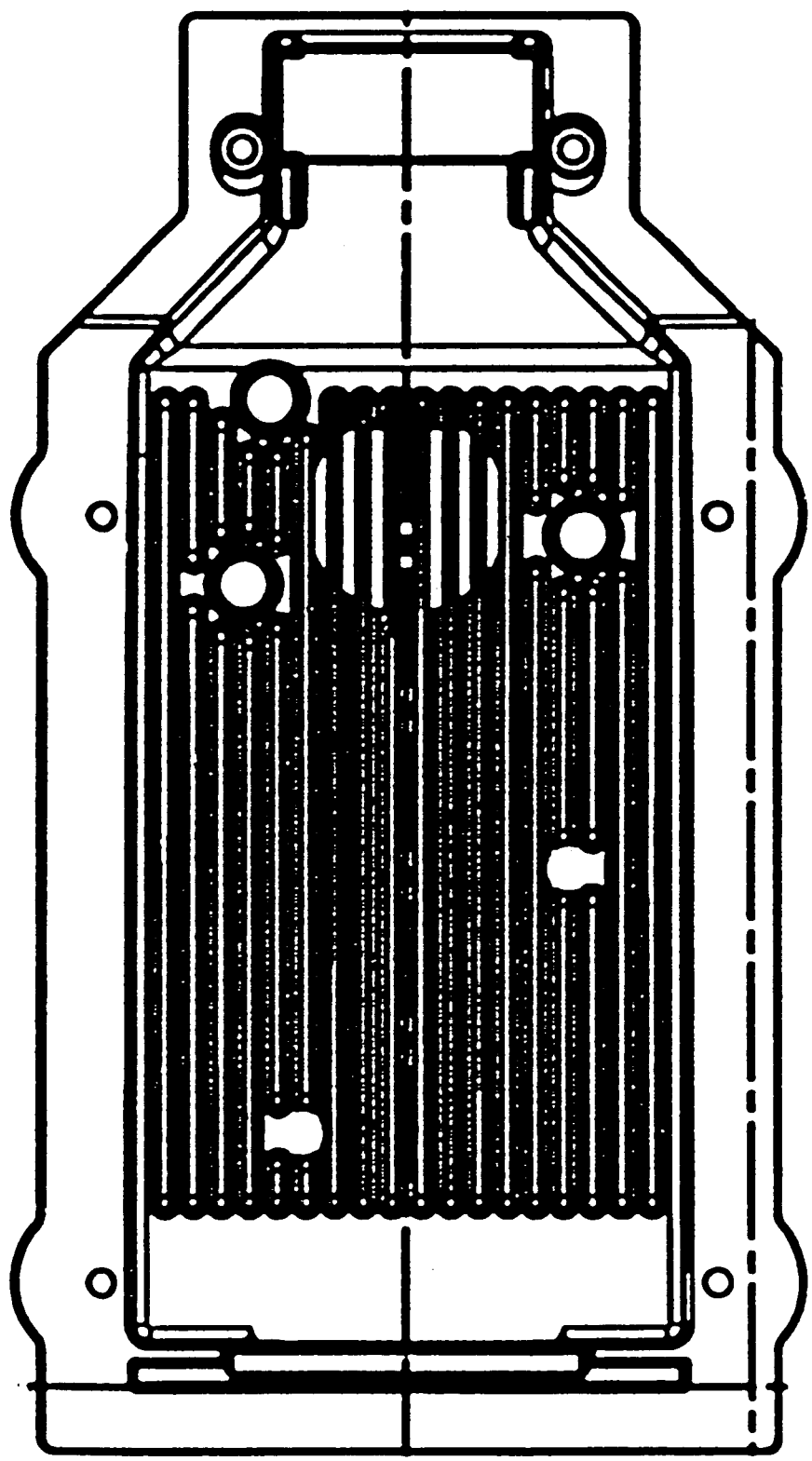
Figure 21:
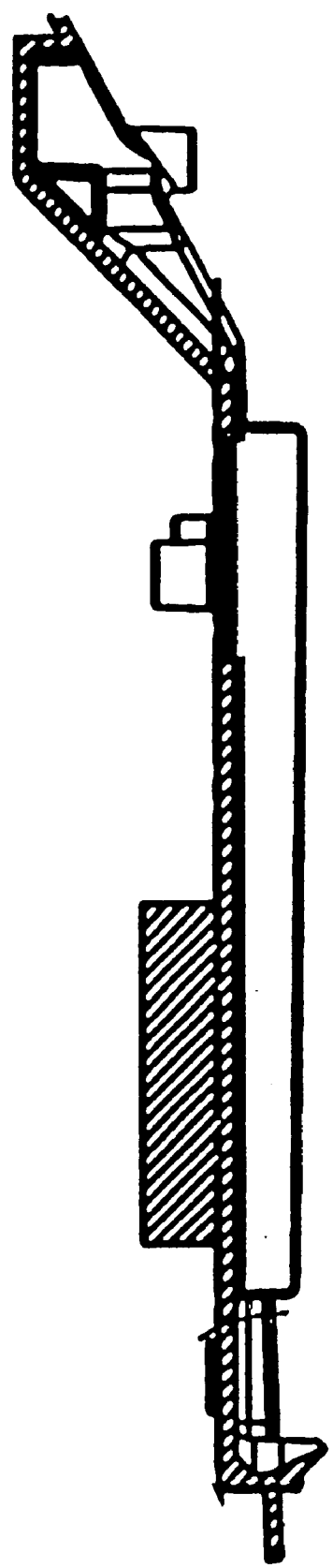

Referring now to FIGS. 19–21, depicted is the preferred embodiment of a heat sink 3030 in accordance with the present invention. The heat sink 3030 is preferably made a metallic substance such as steel. As described above, the heat sink 3030 may form part of the hermetically sealed housing 3004 of a computer 3000. Moreover, the heat sink 3030 may be located within a cooling tunnel 3010 formed on the housing 3004 of the computer 3000.

Heat sink 3030 may be formed with ridges 3034 to increase the surface area of the heat sink that is exposed to the air. Alternatively or coextensivly, the heat sink 3030 may be formed with, grooves, channels, ruts, divots, crests, bumps, or any other surface aberration (not shown) to increase the surface area of the heat sink that is exposed to the air.

The heat sink 3030 may be connected to the housing 3004 by using any fastening method known in the art. These might include but are not limited to adhesives, glues, screws, bolts, rivets or any other fastener known in the art. As shown in FIG. 19, the heat sink 3030 may have attachment holes (3040, 3041, 3042, 3043, 3044, and 3045) to facilitate attachment to the housing 3004 via screws, bolts, rivets or the like (not shown). A gasket or gaskets (not shown) may be used to enhance the hermetic seal between the heat sink 3030 and the housing 3004 when heat sink 3030 is attached.

FIG. 20 shows a top view of the heat sink 3030. The view of FIG. 20 corresponds to the surface of the heat sink that is exposed to the air passing through the cooling tunnel 3010.

FIG. 21 is a side view of the heat sink 3030 depicted in FIGS. 19 and 20.

The following numbered paragraphs (1–15) illustrate some exemplary features of the present invention:

1. A portable computer comprising:
   a housing formed with a cooling tunnel,
   electronic components housed within the housing
   a heat sink hermetically sealed to the housing and located inside the tunnel.
2. A portable computer as described in paragraph 1 wherein the heat sink is thermally engaged to at least on of the electronic components.
3. A portable computer as described in paragraph 1 further comprising an air intake hole formed on the housing and defining a first end of the tunnel.
4. A portable computer as described in paragraph 3 further comprising an air exhaust formed on the housing and defining a second end of the tunnel.
5. A portable computer as described in paragraph 4 further comprising a fan located adjacent to the air exhaust, wherein the fan draws air in the air intake and blows air out of the air exhaust.
6. A portable computer as described in paragraph 1 wherein the heat sink is formed with ridges to increase the surface area of the heat sink that is exposed to the air.
7. A portable computer as described in paragraph 1 further comprising a gasket located between the heat sink and the housing.
8. A method of drawing heat away from a ruggedized electronic device, the device having a housing formed with a cooling tunnel, electronic components housed within the housing, and a heat sink hermetically sealed to the housing and located inside the tunnel, the method comprising:
   drawing air into the cooling tunnel so that the air passes over the hermetically sealed heat sink, and
   exhausting air out of the cooling tunnel.
9. A method as in paragraph 9 wherein a single fan draws air into the cooling tunnel and exhausts air out of the cooling tunnel.
10. A method as in paragraph 10 wherein the fan is located inside the cooling tunnel.
11. An article of manufacture comprising:
    a housing,
    electronic components housed within the housing
    a means for drawing heat away from at least one of the electronic components and protecting the electronic components from environmental contamination.
12. An article of manufacture as in paragraph 11, wherein the means for drawing heat away from at least one of the electronic components is a heat sink hermetically sealed to the housing.
13. An article of manufacture as in paragraph 11, further comprising a tunnel means formed in the housing, wherein the means for drawing heat away from the electronic components resides inside the tunnel means.
14. An article of manufacture as in paragraph 14, further comprising a fan means for drawing air through the tunnel means.
15. A portable computer comprising:
    a housing,
    electronic components housed within the housing
    a heat sink hermetically sealed to the housing and thermally engaging at least one of the electronic components.

We claim as our invention:

1. A shock resistant portable computer comprising:
   a housing formed with an aperture,
   internal components housed within the housing,
   a display visible through the aperture,
   a generally u-shaped shock absorbing frame encasing the perimeter of the display, and
   a metal frame in which the u-shaped frame and the display are retained,
   wherein one half of the u-shaped shock absorbing frame is adhered to the metal frame.

2. A shock resistant portable computer comprising:
   a housing formed with an aperture,
   internal components housed within the housing,
   a display visible through the aperture,
   a generally u-shaped shock absorbing frame encasing the perimeter of the display, and
   a metal frame in which the u-shaped frame and the display are retained,
   wherein the housing comprises an upper housing shell formed with said aperture and a bottom housing shell, and wherein the metal frame is suspended within the upper housing shell by a plurality of fasteners.

3. A shock resistant portable computer comprising:
a housing formed with an aperture,
internal components housed within the housing,
a display visible through the aperture,
a generally u-shaped shock absorbing frame encasing the perimeter of the display, and
a metal frame in which the u-shaped frame and the display are retained,
further comprising a touch screen overlay mounted directly over the display and touchable through the aperture, and further comprising a gasket providing a sealed engagement between the touch screen overlay and the housing.

4. A shock resistant portable computer comprising:
a housing formed with an aperture,
internal components housed within the housing,
a display visible through the aperture,
a generally u-shaped shock absorbing frame encasing the perimeter of the display, and
a metal frame in which the u-shaped frame and the display are retained,
further comprising a shielding member adhered to the metal frame to provide electromagnetic shielding.

5. A shock resistant portable computer comprising:
a housing formed with an aperture,
internal components housed within the housing,
a display visible through the aperture,
a generally u-shaped shock absorbing frame encasing the perimeter of the display, and
a metal frame in which the u-shaped frame and the display are retained,
wherein the metal frame is fixer employed as a mount for at least one of the internal components.

6. A method of constructing a shock resistant portable computer having a display comprising:
encasing the perimeter of the display with a generally u-shaped shock absorbing frame,
mounting the encased display onto a metal frame, and
mounting the metal frame in the portable computer,
wherein the u-shaped shock absorbing frame is adhered to the metal frame.

7. A shock resistant display apparatus for use in a shock resistant portable computer comprising:
a display
a generally u-shaped shock absorbing frame encasing the perimeter of the display, and
a metal frame in which the u-shaped frame and the display are retained,
wherein at least a portion of the u-shaped absorbing frame is a shock absorbing adhesive adhered to the metal frame.

* * * * *